United States Patent
Heidrich et al.

(10) Patent No.: US 12,228,589 B2
(45) Date of Patent: Feb. 18, 2025

(54) RAINBOW PARTICLE IMAGING VELOCIMETRY FOR DENSE 3D FLUID VELOCITY IMAGING

(71) Applicant: KING ABDULLAH UNIVERSITY OF SCIENCE AND TECHNOLOGY, Thuwal (SA)

(72) Inventors: Wolfgang Heidrich, Thuwal (SA); Jinhui Xiong, Thuwal (SA); Xiong Dun, Thuwal (SA); Ramzi Idoughi, Thuwal (SA); Sigurdur Tryggvi Thoroddsen, Thuwal (SA); Andres A. Aguirre-Pablo, Thuwal (SA); Abdulrahman B. Aljedaani, Thuwal (SA); Erqiang Li, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 1207 days.

(21) Appl. No.: 16/928,487

(22) Filed: Jul. 14, 2020

(65) Prior Publication Data
US 2020/0378999 A1    Dec. 3, 2020

Related U.S. Application Data

(62) Division of application No. 15/498,317, filed on Apr. 26, 2017, now Pat. No. 10,782,311.
(Continued)

(51) Int. Cl.
*G01F 3/36*    (2006.01)
*G01P 5/00*    (2006.01)
(Continued)

(52) U.S. Cl.
CPC ................ *G01P 5/26* (2013.01); *G01P 5/001* (2013.01); *G01P 5/20* (2013.01); *G01S 11/12* (2013.01); *G01S 17/58* (2013.01); *G06T 11/00* (2013.01)

(58) Field of Classification Search
CPC .... G01P 5/26; G01P 5/001; G01P 5/20; G01S 11/12; G01S 17/58; G06T 11/00
See application file for complete search history.

(56) References Cited

U.S. PATENT DOCUMENTS 5,479,258 A    12/1995    Hinnrichs et al.
5,883,707 A     3/1999    Arndt et al.
(Continued)

OTHER PUBLICATIONS

Adrian, R. J., and Westerweel, J. 2011. Particle image velocimetry. Cambridge University Press.
(Continued)

*Primary Examiner* — Samantha K Nickerson
(74) *Attorney, Agent, or Firm* — PATENT PORTFOLIO BUILDERS PLLC

(57) ABSTRACT

Imaging of complex, non-stationary three dimensional (3D) flow velocities is achieved by encoding depth into color. A flow volume 22 is illuminated with a continuum 40 of light planes 42 whereby each depth corresponds to a respective light plane 14 having a specific wavelength of light. A diffractive component 46 in the camera 24 optics, which records the trajectories of illuminated particles 20 within the flow volume 22, ensures that all light planes 42 are in focus simultaneously. The setup permits a user to track 3D trajectories of particles 20 within the flow volume 22 by combining two dimensional (2D) spatial and one dimensional (1D) color information. For reconstruction, an image formation model for recovering stationary 3D particle positions is provided. 3D velocity estimation is achieved with a
(Continued)

variant of a 3D optical flow approach that accounts for both physical constraints as well as the color (rainbow) image formation model.

8 Claims, 15 Drawing Sheets

Related U.S. Application Data

(60) Provisional application No. 62/470,168, filed on Mar. 10, 2017, provisional application No. 62/464,928, filed on Feb. 28, 2017.

(51) Int. Cl.
| | |
|---|---|
| *G01P 5/20* | (2006.01) |
| *G01P 5/26* | (2006.01) |
| *G01S 11/12* | (2006.01) |
| *G01S 17/58* | (2006.01) |
| *G06T 11/00* | (2006.01) |

(56) References Cited

U.S. PATENT DOCUMENTS

| | | | |
|---|---|---|---|
| 6,549,274 B1 | 4/2003 | Arndt et al. | |
| 2004/0165681 A1* | 8/2004 | Mohan | H04L 27/001 375/322 |
| 2006/0183059 A1 | 8/2006 | Menon et al. | |
| 2008/0061220 A1 | 3/2008 | Machida | |
| 2013/0083315 A1* | 4/2013 | Lo | G01J 3/46 356/402 |

OTHER PUBLICATIONS

Boyd, S., Parikh, N., Chu, E., Peleato, B., and Eckstein, J. 2011. Distributed optimization and statistical earning via the alternating direction method of multipliers. Foundations and Trends in Machine Learning 3, 1, 1-122.

Brucker C., "3-D PIV via Spatial Correlation in a color-Coded Light-Sheet," Experiments in Fluids, Springer, Heidelberg, OE, Aug. 1, 1996, vol. 21, No. 4, pp. 312-314.

Buchhave, P., "Particle Image Velocimetry—Status and Trends," Experimental Thermal and Fluid Science, Sep. 1, 1992, vol. 5, No. 5, pp. 586-604.

Casey, T. A., Sakakibara, J., and Thoroddsen, S. T. 2013. Scanning tomographic particle image velocimetry applied to a turbulent jet. Phys. Fluids 25, 025102.

Communication Pursuant to Article 94(3) EPC in corresponding/related European Application No. 18159275.9, dated May 29, 2019.

Elsinga, G. E., Scarano, F., Wieneke, B., and Van Oudheusden, B. W. 2006. Tomographic particle image velocimetry. Experiments in Fluids 41, 6, 933-947.

Extended European Search Report in related European Application No. 18159275.9, date of completion of the search May 30, 2018 (Reference D3 was provided in the IDS filed Apr. 26, 2017).

Fedkiw, R., Stam, J., and Jensen, H. W. 2001. Visual simulation of smoke. In Proc. ACM Siggraph, 15-22.

Final Office Action in corresponding/related U.S. Appl. No. 15/498,317, dated Jan. 17, 2020.

Foster, N., and Metaxas, D. 1997. Modeling the motion of a hot, turbulent gas. In Proc. ACM Siggraph, 181-188.

Gregson, J., Ihrke, I., Thuerey, N., and Heidrich, W. 2014. From capture to simulation: connecting forward and in verse problems in fluids. ACM Trans. Graph. 33, 4, 139.

Gregson, J., Krimerman, M., Hullin, M. B., and Heidrich, W. 2012. Stochastic tomography and its applications in 3d imaging of mixing fluids. ACM Trans. Graph. 31, 4, 52-1.

Gu, J., Nayar, S., Grinspun, E., Belhumeur, P., and Ramamoorthi, R. 2013. Compressive Structured Light for Recovering Inhomogeneous Participating Media. IEEE PAMI 35, 3, 555-567.

Hasinoff, S. W., and Kutulakos, K. N. 2007. Photo-consistent Reconstruction of Semitransparent Scenes by Density-sheet Decomposition. IEEE PAMI 29, 5, 870-885.

Hawkins, T., Einarsson, P., and Debevec, P. 2005. Acquisition of Time-Varying Participating Media. ACM Trans. Graph. 24, 3, 812-815.

Heitz, D., M'emin, E., and Schnö 715 RR, C. 2010. Variational fluid flow measurements from image sequences: synopsis and perspectives. Experiments in Fluids 48, 3, 369-393.

Herlin, I., B'er'e 718 Ziat, D., Mercier, N., and Zhuk, S. 2012. Divergence-free motion estimation. In Proc. ECCV, 15-27.

Hinsch, K. D. 2002. Holographic particle image velocimetry. Measurement Science and Technology 13, 7, R61.

Horn, B. K., 722 and Schunck, B. G. 1981. Determining optical flow. Artificial Intelligence 17, 1-3, 185-203.

Hrke, I., and Magnor, M. 2004. Image-Based Tomographic Reconstruction of Flames. In Proc. SCA, 367-375.

Icandes, E. J., Wakin, M. B., and Boyd, S. P. 2008. Enhancing sparsity by reweighted 1 minimization. J. Fourier analysis and applications 14, 5-6, 877-905.

Levoy, M., Ng, R., Adams, A., Footer, M., and Horowitz, M. 2006. Light field microscopy. ACM Trans. Graph. 25, 3, 924-934.

Liu, T., and Shen, L. 2008. Fluid flow and optical flow. J. Fluid Mechanics 614, 253-291.

Liu, T., Merat, A., Makhmalbaf, M., Fajardo, C., and Merati, P. 2015. Comparison between optical flow and cross correlation methods for extraction of velocity fields from particle images. Experiments in Fluids 56, 8, 1-23.

Lourenco, L., Krothapalli, A., and Smith, C. 1989. Particle image velocimetry. In Advances in Fluid Mechanics Measurements. Springer, 127-199.

Lynch, K., Fahringer, T., and Thurow, B. 2012. Three dimensional particle image velocimetry using a plenoptic camera. American Institute of Aeronautics and Astronautics (AIAA).

McGregor, T., Spence, D., and Coutts, D. 2007. Laser based volumetric colour-coded three-dimensional particle velocimetry. Optics and Lasers in Engineering 45, 8, 882-889.

Meinhardt-Llopis, E., Perez, J. S., and Kondermann, D. 2013. Horn-schunck optical flow with a multi-scale strategy. Image Processing on line 2013, 151-172.

Ng, R., Levoy, M., Bredif, M., Duval, G., Horowitz, M., and Hanrahan, P. 2005. Light field photography with a hand-held plenoptic camera. Computer Science Technical Report CSTR 2, 11, 1-11.

Office Action in corresponding/related U.S. Appl. No. 15/498,317, dated Nov. 8, 2019.

Okamoto, K., Nishio, S., Saga, T., and Kobayashi, T. 2000. Standard images for particle-image velocimetry. Measurement Science and Technology 11, 6, 685.

Parikh, N., Boyd, S. P., et al. 2014. Proximal algorithms. Foundations and Trends in Optimization 1, 3, 127-239.

Prasad, A. K. 2000. Particle image velocimetry. Current Science—Bangalore—79, 1, 51-60.

Ruhnau, P., Stahl, A., and Schnorr, C. 2007. Variational estimation of experimental fluid flows with physics-based spatiotemporal regularization. Measurement Science and Technology 18, 3, 755.

Stam, J. 1999. Stable fluids. In Proc. ACM Siggraph, 121-128.

Stanislas, M., Okamoto, K., Kahler, C. J., Westerweel, J., and Scarano, F. 2008. Main results of the third international piv challenge. Experiments in Fluids 45, 1, 27-71.

Watamura, T., Tasaka, Y., and Murai, Y. 2013. LCD projector-based 3D color PTV. Experimental Thermal and Fluid Science 47, 68-80.

Willert, C., and Gharib, M. 1992. Three-dimensional particle imaging with a single camera. Experiments in Fluids 12, 6, 353-358.

Yuan, J., Schö 773 RR, C., and Steidl, G. 2007. Simultaneous higher-order optical flow estimation and decomposition. SIAM Journal on Scientific Computing 29, 6, 2283-2304.

Atcheson, B., et al.; "Time-resolved 3D Capture of Non-stationary Gas Flows"; ACM Transactions on Graphics, vol. 7, No. 5, Article 132; Dec. 2008; pp. 132:1-132:9.

(56) References Cited

OTHER PUBLICATIONS

Candes, E. J., et al.; "Enhancing sparsity by reweighted 1 minimization"; J. Fourier Analysis and Applications 14; Oct. 15, 2008; pp. 877-905.

\* cited by examiner

RAINBOW PARTICLE IMAGING VELOCIMETRY FOR DENSE 3D FLUID VELOCITY IMAGING

CROSS REFERENCE TO RELATED APPLICATIONS

This application is a division of U.S. application Ser. No. 15/498,317, filed on Apr. 26, 2017, which claims the benefit and priority of US. Provisional Application 62/464,928 filed Feb. 28, 2017 and U.S. Provisional Application 62/470,168 filed Mar. 10, 2017, the disclosures of which are incorporated herein by reference in their entirety.

FIELD

This invention relates to fluid capture, particularly in the area of computer graphics. More specifically, the invention is directed to the imaging of complex, three dimensional flow velocities.

STATE OF THE ART

Fluid capture is an active research area in computer graphics. Despite significant recent progress, dense, time-resolved imaging of complex, non-stationary three dimensional (3D) flow velocities remains an elusive goal. Recent works include efforts to image phenomena such as flames [Hasinoff and Kutulaks 2007; Ihrke and Magnor 2004], smoke [Kawkins et al. 2005; Gu et al, 2013], transparent hot air flow [Atcheson et al. 2008], and fluid mixtures [Gregson et al. 2012]. While these methods recover dense volumetric reconstructions, they only yield independent scalar fields of the density of the respective phenomenon at each time step. To fully characterize the 3D flow and open up applications beyond simply play-back, 3D velocity fields need to be recovered as well. While there have been efforts to recover velocities from the captured scalar fields through optical flow-style approaches, these attempts have been limited by the relatively small amount of high-frequency texture in the recovered data [Gregson et al. 2014].

Fluid imaging has many significant applications in scientific and engineering fields such as combustion research, the design of aircraft and underwater vehicles, and the development of artificial heart valves. Since 3D unsteady flows and turbulence are very common in such domains, the main task of the fluid imaging is to allow probing the fluid motions over a range of length scales. In other words, the ultimate goal is to be able to obtain 3D dense measurements of the three components of the velocity vector, known as 3D-3C.

Over the last decades, different imaging techniques have been developed to get closer to this goal. Particle Imaging Velocimetry (PIV) is the most commonly used of these techniques [Lourenco et al. 1989; Adrian and Westerweel 2011]. For PIV, small density-matched tracer particles are inserted into the flow and their advected motion is tracked with image correlation methods, i.e. optical flow. In basic 2D PIC [Okamoto et al. 2000], this tracking is made possible by illuminating the volume with a light sheet perpendicular to the camera line of sight (FIG. 2, left). Particles within that plane can be identified easily, and tracked over time, so long as the flow does not move them out of plane. This yields dense measurements of two components of the velocity field on a two-dimensional slice of the volume (2D-2C). Although 3D extensions such as holographic PIV [Hinsch 2002] or tomographic PIC [Elsinga et al. 2006] exist, a dense reconstruction of all three components of the velocity field over the full 3D volume requires multiple cameras and remains elusive in practice. The densest volume measurements involve high-speed imaging in combination with scanning laser-volumes [Casey et al. 2013].

3D fluid imaging in graphics has, as already mentioned, mostly focused on independent scalar density fields for each time step. Examples for the physical properties recovered in this fashion include the distribution of light emission in flames [Hasinoff and Kutulakos 2007; Ihrke and Magnor 2004], scattering density in smoke [Hawkins et al. 2005; Gu et al 2013], density of a fluorescent dye in fluid mixtures [Gregson et al 2012], as well as the refractive index distribution in hot air plumes [Atcheson et al 2008]. While this data is sufficient for playback in graphics applications, other interesting applications such as re-simulation, or flow editing require velocity fields, instead of just scalar densities. This requires some form of velocity estimation or flow tracking, which is difficult on this kind of input data.

3D particle reconstruction is an alternative to imaging continuous densities, and is used by 3D variants of PIV. The task of the particle reconstruction is to determine the 3D location of particles from one or more camera views. The total number of cameras in these settings is usually very limited due to space constraints, as well as occlusions by solids, and is typically orders of magnitude lower than the number of projections in e-ray tomography, for example. Another practical issue is depth of field of the cameras, since the whole volume needs to be in focus simultaneously and the camera aperture usually has to be large to collect enough light to capture fast flows.

Some examples of 3D extensions of PIV include holographic PIC [Hinsch 2002], which works with coherent light, and tomographic PIV [Elsinga et al. 2006], which utilizes typically 3-5 cameras. Both of these approaches are in practice very hard to set up for many types of flow experiments.

More closely related to our approach are single-camera methods, with a drastically simplified setup. Willert et al. [1992] used a three-pin-hole mask to decode illuminated particles such that the three-dimensional positions of each particle can be retrieved from the image patterns on the observed image via a defocus analysis. Since three dots would appear in the image for each particle, this method is restricted to instances with a low particle seeding density. Another group of approaches made use of plenoptic cameras [Levoy et al. 2006; Ng et al, 2005], which capture the full 4D light field. Particle positions can be reconstructed using ray tracing based algorithms. The idea of applying such technology to measuring volumetric particle distributions has been discussed by [Lynch et al 2012]. However, due to the existence of ghost particles originated from reconstruction algorithm and reduced spatial resolution, it becomes difficult to reveal particle locations with relatively high accuracy. This can also be seen as limited angle tomography with a very narrow cone of observations.

Watamura et al (2013) proposed an algorithm to calculate particles' representative color by averaging hue values of the pixels where the particle is projected on in a polar coordinate. Even though it revealed promising results for Particle Tracking Velocimetry (PTV), where low-density particles are seeded, it will fail for measuring a dense set of velocity fields, where sufficiently high density of particles is required.

Velocity estimation from particle fields has been elaborately studied not only in the field of fluid mechanics, but also in the computer vision community. Literature from the fluid mechanics field mainly adopts correlation-based algorithms [Prasad 2000] for global velocity measurement, which computes the spatial auto-correlation or cross-correlation of successive images, extracting average motion at every single interrogation spot. Though significant improvements have been made on correlation methods [Stanislas et al 2008], they still have issues in areas of low particle density, which is common in 3D measurements.

In a seminal result from computer vision, Horn and Schunck [1981]proposed a global variational optical flow method based on the assumption of brightness constancy and smoothness in the flow vector. The connection between optical flow and fluid flow was investigated by Liu and Shen [2008], which revealed that under certain conditions (mass conservation, inviscid), brightness constancy is equivalent to the scalar transport equation for fluid flow. This connection lends physical meaning to optical flow approaches for fluid tracking. Heitz et al (2010) gave an overview to the applications of optical flow based fluid motion estimation. The estimation accuracy between optical flow and correlation approaches applied to PIV system has been numerically evaluated [Liu et al. 2015].

Since the optical flow problem is physically connected to the continuity equation in fluid dynamics, it becomes feasible to introduce Navier-Stokes equations, which govern real-world fluid motions, as additional physical priors into the conventional Horn-Schunck algorithm. Some previous literature has taken divergence-free constraints into account [Herlin et al. 2012; Yan et al. 2007; Ruhnau et al. 2007], while most of them suffer from the complexity of solving higher order regularization terms. Gregson et al. [2014] simplify this issue by connecting the pressure projection method with the proximal operator, allowing it to be easily handled by a convex optimization framework. Ruhnau et al. [2007] also consider the equation for time evolution of fluid flow, imposing temporal consistency.

SUMMARY OF THE INVENTION

The present invention proposes a new approach to dense, time-resolved imaging of complex, non-stationary 3D flow velocities. The invention extends an established 2D method of Particle image velocimetry (PIV) to three dimensions by encoding particle depth into color. In one aspect the encoding may be achieved by illuminating a flow volume with a continuum of light planes (a "rainbow" of light planes), preferably arranged in parallel. Each light plane may be characterized by a specific wavelength of light, such that a discrete depth within the flow volume corresponds to a specific wavelength of light.

In one aspect of the invention, a particle image velocimetry system may include a light source and a means for directing light from the light source into a flow volume, containing a quantity of fluid and at least one particle. The light is directed into the flow volume in the form of a plurality of light sheets, with each light sheet having a single wavelength. In a preferred aspect at least one of the light sheets has a wavelength, which is dimensionally different from a wavelength of another light sheet. The invention may also include a detection apparatus for detecting reflections of light from the at least one particle within the flow volume.

As regards hardware, a light source, preferably a white light source, may be utilized. In a further aspect of the invention, the light source provides a quantity of incoherent light. A collimator, positioned proximate the light source, may be employed to receive light from the light source. The collimator may be adjusted to arrange lights rays, issuing from the light source, to be substantially parallel to one another. A linear color filter, may be positioned to receive light from the collimator and subsequently employed to produce a continuous wavelength-gradation pattern of light, i.e. a rainbow illumination. This wavelength gradation pattern may assume the configuration of a plurality of light planes, i.e. a continuum of light planes, preferably arranged parallel to one another and positioned to extend over a portion or in some instances, substantially the entire depth of the flow volume.

The detection means, which may in some cases be a camera, may in one aspect of the invention include a diffractive component in its optical structure to ensure that all of the light planes are in focus simultaneously. To facilitate this result, in one aspect of the invention, a diffractive optical element (DOE) may be attached to a camera's objective lens, in order to achieve a wavelength-selective focus that coincides with the rainbow illumination planes. The invention may thus provide a hybrid refractive-diffractive optical system, adapted to focus all wavelengths on the same sensor plane, thereby extending the depth-of-field, while preserving high lateral resolution, of the detection means. With this setup, for example, a single color camera may be sufficient to track 3D trajectories of particles by combining 2D spatial and 1D color information. Utilizing this setup, the reflection of light from different particles, having different wavelengths and hence indicating that the particles are positioned at different depths, may be focused on the sensor plane of the detection means.

The hardware of the instant invention may be adapted to determine the locations of the particles in the volume by utilizing the 2D spatial positions of those particles and by the colors in the captured image using a mapping between color and depth position.

A further aspect of the invention may include a method for obtaining a three dimensional, three component velocity measurement of particles moving within a flow volume. The inventive method may combine a suitable setup for color-based encoding of the third dimension in the volumetric PIV, with a powerful algorithm to retrieve both the particle positions and the velocity vector field. For reconstruction, an image formation model for recovering stationary 3D particle positions may be provided. 3D velocity estimation may be achieved with a variant of 3D optical flow that accounts for both physical constraints as well as the rainbow image formation model. The reconstruction algorithm may utilize a detailed image formation model for this setup to retrieve the 3D location of particles in each frame. This may enable an integration of the temporal coherence regularization terms into the optical flow model, which may then be solved by a modular optimization framework. From a sequence of successively recorded frames, the velocity vector field may be reconstructed using an optical flow approach, where physical constraints (incompressible flow, temporal consistency of the flow) may be introduced. The inventive method therefore may introduce a physically constrained optical flow method for recovering the fluid velocity fields, and evaluating its effectiveness on synthetic data. The instant approach may therefore provide a good estimation of velocity over the measurement volume (high concentration of particles). In order to improve the obtained results, the user may iterate between position and velocity estimation, effectively solving a joint optimization problem for both.

In one aspect the inventive method may include the steps of (1) providing a time sequenced series of images of a flow volume, containing at least one particle resident within a fluid, wherein depth information of the at least one particle within the fluid volume is color coded into the image(s) as a consequence of the particular wavelength(s) of the light, which is reflected from the at least one particle. Thereafter, (2) tracking a three dimensional (3D) trajectory of the at least one particle by analyzing the two dimensional (2D) spatial motion of the at least one particle in a plane of the image and any changes in the color of the wavelength of light, reflected from the at least one particle.

In one aspect of the inventive method the step of providing a time sequenced series of images of a flow volume, containing at least one particle resident within a fluid, may include: (1A) illuminating the flow volume with a plurality of light sheets, with each light sheet having a respective depth positioning within the flow volume and a specific wavelength associated therewith; (1B) detecting reflections of light from the at least one particle within the flow volume, with a detection means, preferably an optical device; and (1C) recording the reflections of light from the at least one particle in an image, wherein depth information of the at least one particle within the fluid volume is color coded into the image as a consequence of the particular wavelength of the light sheet, which is reflected from the at least one particle.

In yet another aspect of the inventive method (1D) the detection means may be adapted with a diffractive optical apparatus to assist the detection means to focus all of the wavelengths of the lights sheets simultaneously to achieve simultaneously a high lateral resolution and a relatively large depth of focus.

In yet a further aspect of the inventive method, the plurality of light sheets may be arranged to form a continuum of light sheets, preferably with the wavelengths of the individual light sheets varying linearly over the depth positioning of the individual light sheets.

With respect to the step of tracking a three dimensional (3D) trajectory of at least one particle, in one aspect of the inventive method that step may further include a step of (2A) estimating an initial location of the at least one selected particle within the flow volume. The estimation of an initial location for the at least one particle may, in a further aspect, include constructing a probability distribution of the initial location, calculated using the series of time sequenced images of the at least one selected particle. Tracking the trajectory may further include (2B) reconstructing fluid velocity vector fields using a series of time sequenced probability distributions for particle locations. Moreover, the flow vectors may be computed using a three dimensional (3D) optical flow technique that accounts for both physical constraints, as well as the color coding of depth information in the images.

A primary advantage of this approach, compared to other 3D PIV methods, is its simplicity. Nevertheless, the presence of random noise, optical aberrations and focus issues, color contamination caused by secondary light scattering from the particles, and color mixing for overlapping particles severely complicate the identification of the representative colors for every possible particle in the observed image.

While the instant method exploits the idea of encoding particle depth by color, it also employs a combination of coded illumination and modified camera optics to solve a number of the issues, which complicate prior existing methods. Moreover, the instant invention provides a new optimization-based joint reconstruction of both particle position and velocity field.

DETAILED DESCRIPTION OF THE ILLUSTRATED EMBODIMENTS

Figure 1:
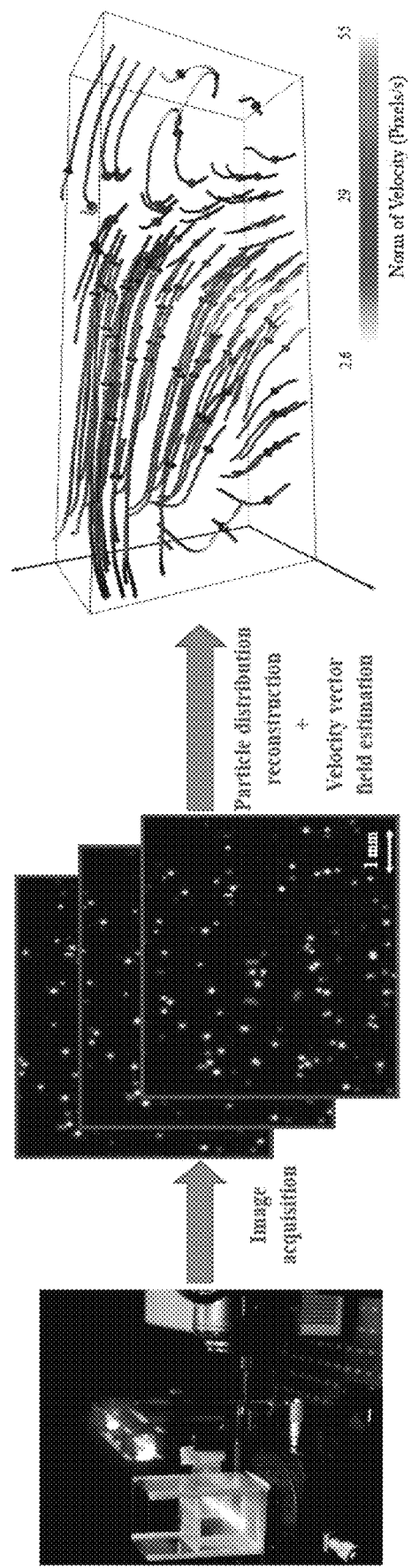
FIG. 1 is a process diagram showing the use of a rainbow color-coded PIV setup of the invention in combination with a hybrid diffractive/refractive camera optics (left) to encode 3D particle positions in fluid flows into a single camera image, while keeping all particles in focus simultaneously (center). From a sequence of such images 3D particle positions and the dense fluid vector field can be reconstructed using an optimization-based approach. The vector field is represented as a regular grid covering the entire flow volume, and can be visualized by showing the path lines of new (synthetic) particles (right).

As illustrated in FIG. 1, the Rainbow PIV invention includes two primary aspects: a new hardware setup that encodes particle depth into a color image, with a large depth of field, and a matching new reconstruction algorithm that jointly optimizes assessing particle position and determining a velocity vector field. Each aspect may be utilized independently from the other or the two aspects may be used in combination depending on the purpose(s) of the user.

Figure 2:
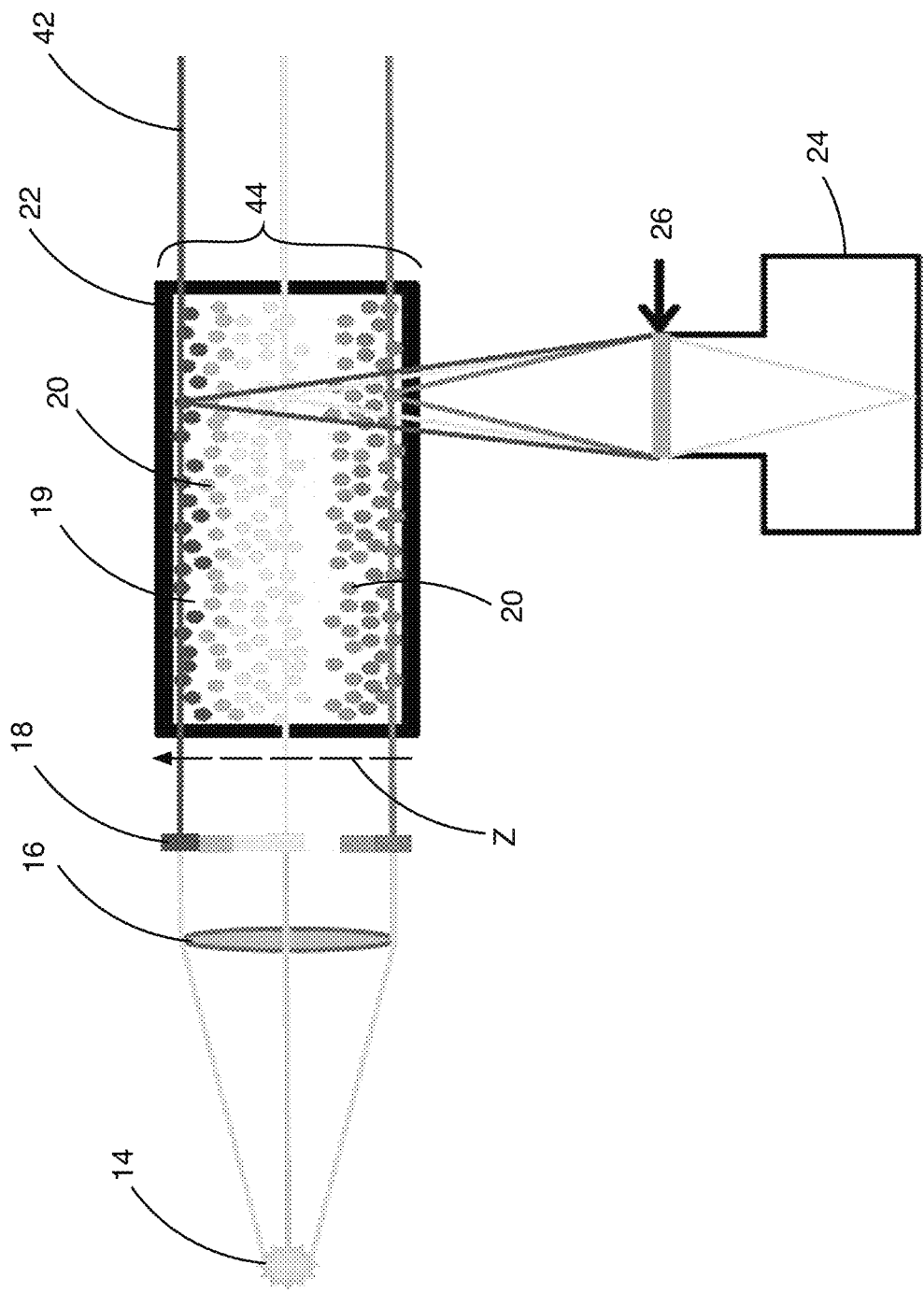
FIG. 2 is a schematic representation of an example of a setup of the invention.

FIG. 2 discloses an embodiment of an optical setup of the invention, which includes a combination of a white light source 14, a collimator 16 and a linear bandpass filter 18, which cooperatively produce a parallel rainbow beam of light. The rainbow beam is directed into a flow volume 22 having a fluid 19 and particles 20 resident therein. After the light reflects off of the particles 20, present in the flow volume (tank) 22, the reflected light is detected and acquired by a camera 24. A hybrid refractive-diffractive lens (lens+ DOE) 26 is used to ensure that light, reflected from a substantial number of particles 20 in the measurement flow volume 22, is focused on the same sensor plane of the camera 24.

Figure 3:
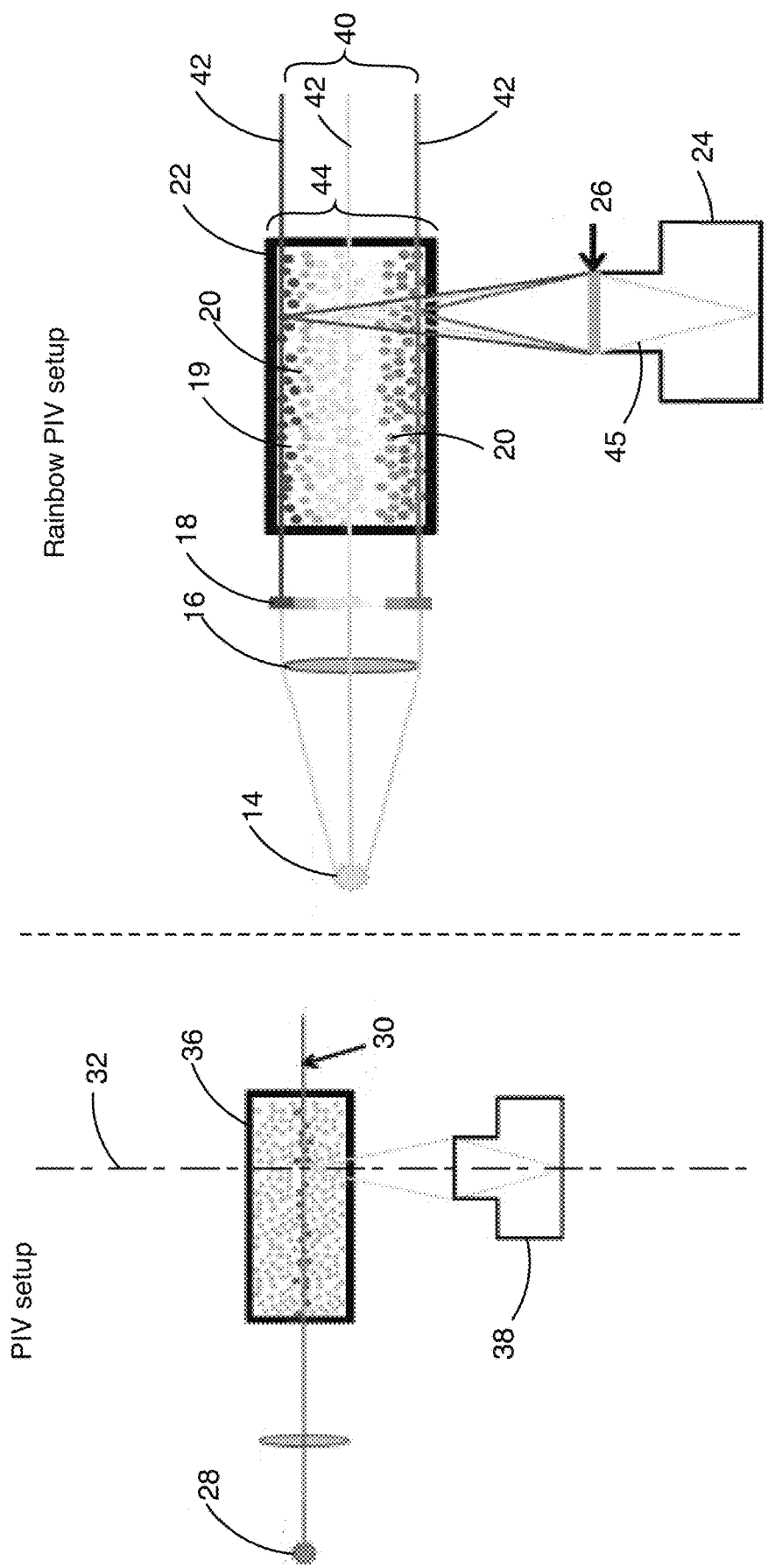
FIG. 3 is a schematic comparison between the measurement setups for standard PIV (left) and the new inventive Rainbow PIV (right).

A comparison between the setups for a regular PIV and the Rainbow PIV is shown in FIG. 3. In a regular PIV, shown at the left, a laser 28 is used to create a light sheet 30 positioned perpendicular to the camera line of sight 32. A single vertical plane 34 of the volume 36 is illuminated by light sheet 30. A camera 38, focused on the plane 34, is adapted to detect and record particles 20, resident within plane 34 by detecting the reflection of light from the light sheet 30 off of the particles 22. The camera 38 is adapted to produce an image which illustrates a two dimensional rendering of the particles' locations within the flow volume. The regular PIV setup is therefore suitable for providing two components of the velocity field upon an examination of a 2D slice of the volume, thereby providing a two dimensional, two component (2D-2C) description of the velocity field within the flow volume.

In contrast to the conventional PIV arrangement, in applicant's Rainbow PIV system, shown to the right in FIG. 3, the 3D volume 22 is illuminated by a continuum 40 of light planes 42, with each light plane having a specific wavelength of light associated therewith. In a preferred aspect the wavelength of the overall illumination may vary, preferably linearly, over the depth 44 of the flow volume 22. Particles 20 in the volume 22 can thus be modeled as narrow-band point sources. A diffractive optical element (DOE) 26, attached to the camera lens 45, ensures that for each wavelength the camera 24 is focused at the appropriate depth.

More specifically, in the aspect of applicant's invention shown in FIG. 3 the illumination is provided by a white light source 14 that is collimated by collimator 16 and filtered by filter 18. In prior PIV arrangements, lasers, which emit coherent light, having a singular wavelength, e.g. light having a single color, were utilized. The instant invention utilizes white light, e.g. incoherent light, which may include light having various wavelengths and hence various colors. Light issuing from the light source 14 is received by a collimator 16, positioned proximate to the light source. The collimator 16 functions to align the rays of white light along parallel trajectories or pathways. Light issuing from the collimator 16 is received by a filter 18, which is positioned proximate the collimator 16. The filter operates to split the white light and thereby arrange the resulting spectrum of light into a series of parallel planar sheets 42, wherein each light sheet 42 may be characterized by a single wavelength of light. The planar sheets 42 are directed into the flow volume 22 by the filter 18. In a preferred aspect, the wavelengths of the various sheets 42 vary linearly with the depth 44, i.e. along the z axis, within the flow volume 22. In this setup, particles 20 submersed in a fluid 48 within the flow volume 22 can be modeled as narrow-band point lights.

Figure 5:
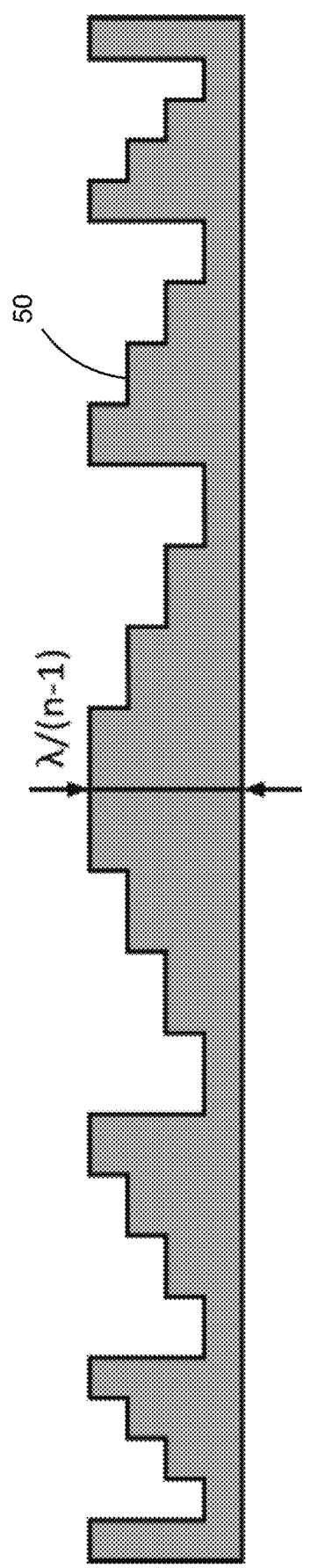
FIG. 5 is a side view of a Fresnel phase plate, which may be utilized in the invention.

A second part of the optical system, namely the diffractive optical element 46, may include a Fresnel phase plate 50, to provide a wavelength-selective focus. A example of such a Fresnel phase plate is shown in FIG. 5. The optical system is designed such that the camera focus for each wavelength corresponds to the depth at which that wavelength occurs in the rainbow illumination within the flow volume. This design achieves all-in-focus imaging of the particles 20 in the interrogation volume 22.

Figure 7:
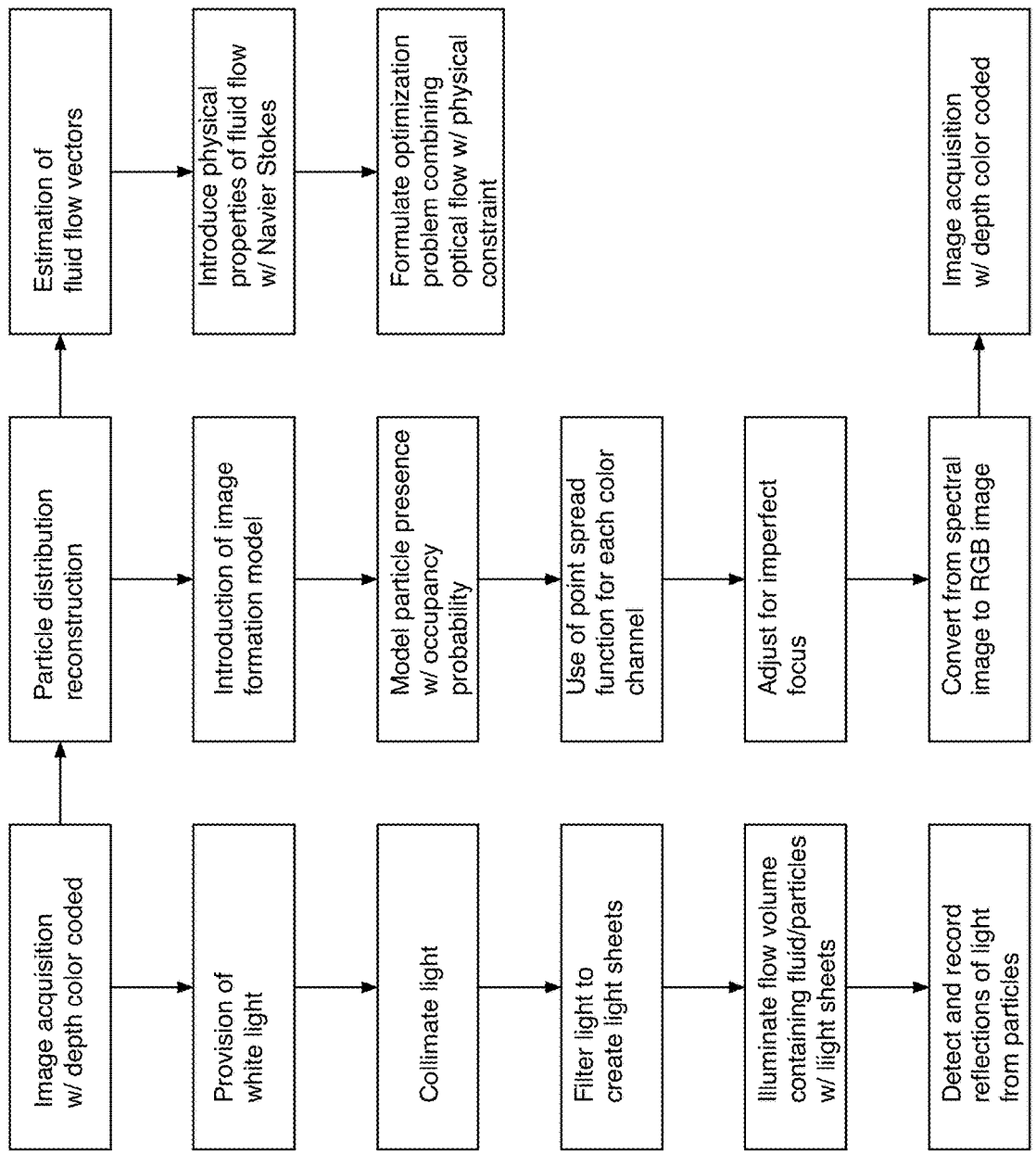
FIG. 7 shows a schematic view of the various method steps of a method of the instant invention.

Turning now to the method for processing of data, extracted from an operation of the hardware described above, the method involves two primary steps. In the fist step a time sequenced series of images of a flow volume containing at least one particle resident within a fluid, wherein depth information of the at least one particle within the fluid volume is color coded into the images as a consequence of the particular wavelength of the light, which is reflected from the at least one particle is provided. In a second step, a three dimensional (3D) trajectory of the at least one particle is obtained by analyzing the two dimensional (2D) spatial motion of the at least one particle in a plane of the images and a change in color of the wavelength of light reflected from the at least one particle. The step of providing a time sequenced series of images is a consequence of the operation of the setup described above over a predetermined period of time with photographs being taken of the flow volume at selected time intervals. Once the user has obtained the images, the task of analyzing those images involves two primary steps, first a reconstruction task to estimate a particle 20's position from the observed color associated with each particle 20, and secondly to track those particles over time to obtain a 3D velocity field. The inventive method permits a full 3D, three component (3D-3C) measurement. The steps of the inventive method are shown in greater detail in FIG. 7.

This method is made more complicated by the fact that the camera 24 captures only red-green-blue (RGB) information, and not a full hyperspectral image, which makes the position reconstruction less robust. To tackle this problem, an iterative approach is employed. An initial position estimate for each time step can be used to obtain a first estimate of the time-dependent velocity field. This velocity field can be used to refine the position estimate by adding physical priors that tie together all the time steps. These two iterative steps are described in detail below.

To estimate the positioning of particles within a flow volume an inverse problem is proposed for recovering particle locations in 3D spatial domain. We start by introducing an image formation model that relates the obtained particle positions to the observed image. Three regularization terms are then added to formulate an optimization problem, which can be efficiently solved with guaranteed convergence, thereby addressing our ill-posed inverse problem.

As mentioned above, the illumination in the volume 16 is designed to include a continuum of light sheets 42 (FIG. 2) with a narrow-band spectrum, whose wavelength varies with depth (z coordinate). In the invention, we restrict ourselves to a linear relationship between z (depth) and λ (wavelength), since this setting may be implemented with off-theshelf components. Therefore, the location of particles 20 in the volume 22 can be geometrically represented as the position of light plane 42 specified by wavelength and pixel positions in that light plane $(x, \lambda) = (x, y, \lambda)$. The presence of a particle at a specific point in the volume 22 is modeled as an occupancy probability $P(x, \lambda)$.

Since we are operating with incoherent light, the imaging process of the optical system can be modeled as a set of point spread functions (PSF), one for each color channel: $g_C(x, \lambda)$ where $C \in \{\text{red, green, blue}\}$. With these definitions, the image formation model is:

$$i_C(x) = \int_\Lambda \int_X g_C(x-x', \lambda) \cdot i_r(x, \lambda) \cdot P(x, \lambda) dx' d\lambda, \quad (1)$$

where $i_C(x)$ are the color channels of the capture RGB image, and $i_r(x, \lambda)$ is the corresponding spectral distribution incident on the image sensor. The spatial integral corresponds to a convolution representing a potentially imperfect focus, while the wavelength integral represents the conversion from a spectral image to an RGB image encoding 3D particle positions.

After discretization, we can formulate the convolution of PSFs and reflected light intensity as a matrix $A \in \mathbb{R}^{3N \times NL}$, where N is the number of image pixels, L is the number of discretization levels along the wavelength coordinate, and the value of 3 refers to three color channels. Moreover, $i_t \in \mathbb{R}^{3N}$ represents the observed image at time t and $p_t \in \mathbb{R}^{NL}$ is the occupancy probability of a specific voxel, given $i_t$. Hence, the distribution of particles at each time step of a video can be retrieved by solving the linear system $$Ap_t = i_t. \quad (2)$$

However, this inverse problem is problematic, as we have compressed the full spectral information, encoding the particle position, into just three color channels. To handle this inverse problem, some prior knowledge of the distribution of particles is introduced as regularization terms, resulting in the following minimization problem:

$$(p^*) = \quad (3)$$

$$\underset{p}{\operatorname{argmin}} \frac{1}{2} \|A[p_1|\ldots|p_T] - [i_1|\ldots|i_T]\|_2^2 + \kappa_1 \|\operatorname{diag}(w)(p_1; \ldots; p_T)\|_1 +$$

$$\prod_{[0,1]}(p_1; \ldots; p_T) + \kappa_2 \sum_{t=1}^T \int_\Omega p_t \odot ((p_t - p_{t+1}(u_t, -\Delta t)))^2 d\Omega.$$

where the first line is a least-square data fitting term, corresponding to Equation 2. The second line defines a weighted $L_1$ term that encourages sparse distributions of particles in the volume, and the indicator function forces occupancy probabilities to be between zero and one.

Finally, the term of the third line provides temporal coherence by mandating that occupancy probabilities of successive time frames are consistent with advection under a previously estimated flow field $U_t = (u_t, v_t, w_t)$. We call this term the particle motion consistency term, and it allows for refining position estimates once a velocity field has been estimated, and ties the reconstruction of all frames together into a single optimization problem. The particle motion consistency term is discussed in more detail below. The above optimization problem is non-smooth because of the $L_1$ term and the indicator function, and therefore the problem cannot be solved by general optimization tools, such as a gradient descent. The strategy for tackling this kind of issue is to decouple non-smooth terms from the original optimization problem, such that distinct parts can be handled separately. We apply this strategy using the ADMM framework, which is systematically discussed in [Boyd et al. 2011].

Algorithm 1
ADMM Framework of Computing Particle Distribution

1: procedure COMPUTEPARTICLELOCATION( $F_1$, $H_1$ )
2:    for from 1 to maximum ADMM iteration do
3:       // p-minimization step
4:       $p^{j+1} \leftarrow \operatorname{prox}_{\sigma_1 F_1} (z^j - q^j)$
5:       // z-minimization step
6:       $z^{j+1} \leftarrow \operatorname{prox}_{\tau_1 H_1} (p^{j+1} + q^j)$
7:       // scaled dual variables update
8:       $q^{j+1} \leftarrow q^j + p^{j+1} - z^{j+1}$
9:    end for
10: end procedure The pseudo code for solving Equation 3 using ADMM is shown in Algorithm 1, where j is the iteration number, z is a slack variable, q is a dual variable, or Lagrange multiplier. $\operatorname{prox}_{\sigma_1 F_1}$ and $\operatorname{prox}_{\tau_1 H_1}$ are proximal operators [Parikh et al 2014] based on $F_1$ and $H_1$ respectively. $F_1$ and $H_1$ are defined as:

$$F_1(p) = \frac{1}{2} \|A[p_1|\ldots|p_T] - |i_1|\ldots|i_T|\|_2^2 + \quad (4)$$

$$\kappa_2 \sum_{t=1}^T \int_\Omega p_t \odot ((p_t - p_{t+1}(u_t, -\Delta t)))^2 d\Omega$$

$$H_1(p) = \kappa_1 \|\operatorname{diag}(w)(p_1; \ldots; p_T)\|_1 + \prod_{[0,1]}(p_1; \ldots; p_T) \quad (5)$$

The derivation of the proximal operators in Algorithm 1 follows. To simplify the notations, we denote $z^j - q^j$ as $d^j$, $p^{j+1} + q^j$ as $e^j$, $u_t^{j+1} + q^j$ as $h^j$, $p_{t+1}(u_t, -\Delta t)$ as $\hat{p}_{t+1}^-$. For Algorithm 1:

$$p = \quad (6)$$

$$\operatorname{prox}_{\sigma_1 F_1}(d) \Rightarrow \begin{bmatrix} \sigma_1(A^T(Ap_1) + f_{1,2}(p)) + p_1 \\ \vdots \\ \sigma_1(A^T(Ap_t) + f_{t,t-1} + f_{t,t+1}) + p_t \\ \vdots \\ \sigma_1(A^T(Ap_T)) + f_{T,T-1}) + p_T \end{bmatrix} = \begin{bmatrix} \sigma_1 A^T i_1 + d_1^j \\ \vdots \\ \sigma_1 A^T i_t + d_t^j \\ \vdots \\ \sigma_1 A^T i_T + d_T^j \end{bmatrix}$$

where $$f_{t,t+1}(p) = 2\kappa_2 p_t \odot (p_t - \hat{p}_{t+1}^-) + \kappa_2 (p_t - \hat{p}_{t+1}^-)^2, \quad (7)$$

$$f_{t,t-1}(p) = 2\kappa_2 p_{t-1} \odot (\hat{p}_t^- - p_{t-1}).$$

$$z = \operatorname{prox}_{\tau_1 H_1}(e^j) \Leftrightarrow z = \prod_{[0,1]} \left( (e^j - \tau_1 \kappa_1 w)_+ - (-e^j - \tau_1 \kappa_1 w)_+ \right).$$

In the first term, p is represented by procedural operator on the left hand side of Equation 10, and it is solved by Conjugate Gradients. The second term is the point-wise shrinkage operation followed by a projection onto the domain of $[0,1]$.

The $L_1$ penalized term ensures a sparse distribution of particles in the volume. It is further weighted by a diagonal matrix diag (w). Unlike the algorithm proposed in [Candes et al. 2008], which iteratively changes the weight coefficients based on previous results for enhancing sparsity. Weights in our approach are fixed during iterations, but vary with particle depth. The motivation for this process is to compensate for different sensitivities of the camera to different wavelengths. For example, wavelengths in the yellow or in the blue-green part of the spectrum elicit a strong response in two or even three color channels, while wavelengths in the far blue or far red parts only trigger one channel. This can result in a non-uniform particle distribution, where particles are more likely to be placed at certain preferred depths. The weighting term allows us to eliminate this bias by compensating for the photometric non-uniformity.

As previously mentioned, particle motion consistency ensures that estimated particle locations in successive frames are consistent with advection through a previously estimated flow field. This transforms the position estimation process from a set of independent problems, one for each time step, to a single joint estimation problem for the whole sequence. This term can be improved by adding a mask to suppress the impact of low confidence flow estimates.

Having discussed a method for estimating the particle location, we now describe how to estimate the fluid flow vectors from the reconstructed 3D particle distributions in a video frame. First, we introduce the physical properties of fluid flow formulated in Navier-Stokes equations, and then formulate an optimization problem, constructed by combining conventional optical flow with those physical constraints.

As incompressible flow can be described as a solenoidal flow vector field $u_{sol}$ which is divergence free:

$$\nabla \cdot u_{sol} = 0. \quad (8)$$

Based on the Helmholtz decomposition, any arbitrary vector field u (in our case an intermediate flow vector obtained that does not satisfy the divergence-free constraints) can be decomposed into a solenoidal (divergence-free) part and an irrotational (curl-free) part. The irrotational flow vector is the gradient of some scalar function (pressure P in our case) hence, we can express the Helmholtz decomposition as $$u = u_{sol} + \nabla P/\rho, \quad (9)$$

where $\rho$ defines density. Taking the differential (divergence) of both sides, we obtain $$\nabla \cdot u = \nabla^2 P/\rho (\text{since } \nabla \cdot u_{sol} = 0). \quad (10)$$

With the intermediate vector field u, the scalar function P can be computed by solving the above Poisson equation, and then the solenoidal flow vector field can be simply retrieved as $$u_{sol} = u - \nabla P/\rho. \quad (11)$$

Equations 10 and 11 represent a pressure projection $\Pi_{C_{DIV}}$ operation that projects an arbitrary flow field onto the space of divergence-free flows $C_{DIV}$, and is widely used in fluid simulation. Mathematically, this step corresponds to an operator splitting method [Gregson et al. 2014].

With reference to temporal coherence, the incompressible Navier-Stokes equation describes the time evolution of fluid velocity vector fields given by:

$$\frac{\partial u}{\partial t} + (u \cdot \nabla)u = -\nabla \mathcal{P}/\rho + (\nabla \cdot \bar{\mathcal{T}})/\rho + f, \quad (12)$$

where P is the pressure, $\bar{\tau}$ is deviatoric stress and f is an external force. For a non-viscous fluid in absence of external force and ignoring the unknown pressure gradient term, Equation 12 becomes:

$$\frac{\partial u}{\partial t} + (u \cdot \nabla)u = 0, \quad (13)$$

which refers to an approximate evolution of fluid velocity over time. On the basis of this equation, we can advect the fluid velocity at the current time step by itself and then project it onto a space of divergence-free flows to generate an estimation of the subsequent velocity field, and vice versa. This time evolution equation will be introduced into the optimization problem discussed in the following as a soft constraint.

We aim to reconstruct the fluid flow velocity vector fields based on a physically constrained optical flow model. The extended optical flow model is formulated as:

$$u_t^* = \underset{u_t}{\operatorname{argmin}} \int_\Omega p_t \odot ((p_t - p_{t+1}(u_t, -\Delta t)))^2 d\Omega + \quad (14)$$

$$\kappa_3 \|\nabla u_t\|_2^2 + \kappa_4 \left( \left\| M\left(u_t - \prod_{C_{DIV}}(u_{t-1}(u_{t-1}, \Delta t))\right) \right\|_2^2 + \right.$$

$$\left. \left\| M\left(u_t - \prod_{C_{DIV}}(u_{t+1}(u_{t-1}, -\Delta t))\right) \right\|_2^2 \right) + \prod_{C_{DIV}}(u_t),$$

Each line of which is explained hereafter:
(1) The first line describes the conventional Horn-Schunck optical flow model except that the brightness constancy constraint is replaced with the masked particle motion consistency as discussed above.
(2) The second and third lines describe the temporal coherence regularization as explained above: the fluid velocity at the current time step is approximated by either forward warping the flow vector at the previous time step by itself, followed by a projection operation or by backward warping, the flow vector at the next time step by the current flow, followed again by a projection operation. The binary mask M is employed to ensure confidence-based weighting, giving 0 for the flow vectors near the boundary and 1 for vectors in the central region. The fourth line represents an indicator function of the projection method introduced above. Gregson et al [2014] found that the projection operation is equivalent to the proximal operator for the space of the divergence-free constraint into the original optical flow model, which can still be efficiently solved by well-known optimization frameworks.

We formulate this optimization problem in the ADMM framework in Algorithm 2, where the definitions of the functions $F_2$ and $H_2$ are given below.

$$F_2(u_t) = p_t \odot (p_t - p_{t+1}(u_t, -\Delta t)))^2 + \quad (15)$$

$$\kappa_3 \|\nabla u_t\|_2^2 + \kappa_4 \left( \left\| M\left(u_t - \prod_{C_{DIV}}(u_{t-1}(u_{t-1}, \Delta t))\right) \right\|_2^2 + \right.$$

$$\left. \left\| M\left(u_t - \prod_{C_{DIV}}(u_{t+1}(u_t, -\Delta t))\right) \right\|_2^2 \right)$$

$$H_2(u_t) = \prod_{C_{DIV}}(u_t) \quad (16)$$

| Algorithm 2 |
| --- |
| ADMM Framework of Computing Fluid Velocity Vector Fields |
| 1:     procedure COMPUTEVELOCITY ($F_2$, $H_2$) |
| 2:        for from 1 to ADMM iterations do |
| 3:           // u-minimization step |
| 4:           $u_t^{j+1} \leftarrow \text{prox}_{\sigma_2 F_2}(z^j - q^j)$ |
| 5:           // z-minimization step |
| 6:           $z^{j+1} \leftarrow \text{prox}_{\tau_2 H_2}(u_t^{j+1} + q^j)$ |
| 7:           // scaled dual variables update |
| 8:           $q^{j+1} \leftarrow q + u_t^{j+1} - z^{j+1}$ |
| 9:        end for |
| 10:    end procedure |

For Algorithm 2:

$$u_t = \text{prox}_{\sigma_2 F_2}(d) \Leftrightarrow (\sigma_2 A + \Pi) u_t = d^j - \sigma_2 b$$

$$A = p_t \odot (\nabla \hat{p}_{t+1}^-)^2 + k_3 \nabla^2 + 2 k_4 M$$

$$b = p_t \odot ((\hat{p}_{t+1}^- - p_t) - \nabla \hat{p}_{t+1}^- u_t^k) \nabla \hat{p}_{t+1}^- - k_4 M$$
$$(\Pi_{C_{DIV}}(\hat{u}_{t-1}^{k1}) + \Pi_{C_{DIV}}(\hat{u}_{t+1}^{k})) \quad\quad (17)$$

where $$\hat{u}_{t+1}^{k-1} = u_{t+1}(u_t^k - \Delta t)$$

$$\hat{u}_{t-1}^{k} = u_{t-1}(u_{t-1}^k, \Delta t)$$

$$z = \text{prox}_{\tau_2 H_2}(h^j) \Leftrightarrow z = \Pi_{C_{DIV}}(h^j) \quad\quad (18)$$

By applying the fixed-point theorem to tackle the nonlinear optimization problem, $u^k$ in the first term refers to the result in the $k^{th}$ iteration. We use Conjugate Gradients to solve this linear system in combination with an incomplete Cholesky factorization. The second term is a simple pressure projection step.

In addition, a coarse-to-fine strategy is applied to deal with large displacements. The algorithm begins from the coarsest level, and an initial guess of optical flow at the next finer level is obtained by scaling up the flow computed in the coarser level. It should be noted that in this case, the above optimization problem becomes non-linear in $u_t$ on account of the warping term $p_{t+1}(u_t, -\Delta t)$. To tackle this issue, the non-linear term is linearized by using first order Taylor expansion and $u_t$ is updated iteratively based on fixed-point theorem. More detailed descriptions about this approach are given in Meinhardt-Llopis et al 2013.

For a sequence of fluid velocity vector fields, each of them is solved independently, in subsequent flows in current iteration, and also the previous flows in the subsequent iterations.

EXAMPLE

Experimental setup: FIG. 2 illustrates the experimental setup configuration used to evaluate the performance of the Rainbow PIV setup and method.

Rainbow light generation: The experiments were performed using a high power plasma light source 14, combined with a liquid light guide (HPLS245, Thorlabs) to generate a white light (output spectrum: [390,730 nm]. A collimator 16 was added to obtain a parallel light beam. It is important to have a parallel light beam, to guarantee that two particles, having the same depth, will be illuminated by the same colored light, i.e. light having the same wavelength.

To split the white light into a rainbow beam, a continuously linearly varying bandpass filter (LF103245, Delta Optical Thin Film) was employed. Other alternatives such as a prism and blaze grating were also considered for this purpose in view of their respective ability to generate a rainbow beam. Although a bandpass filter was eventually selected for purposes of the invention, it should be understood that these alternatives for splitting the white light also form part of the invention. However, after comparison, the linear filter appeared as the best solution for its effectiveness and simplicity. The generated beam encompassed a spectral range from 480 nm to 680 nm, corresponding to a depth range of 18 mm in the z direction Given the height of the beam and the length of the flow volume (tank), the two other dimensions of the measurement volume were 50.1 mm along the x axis and 25.6 mm along the y axis.

Acquisition device: To record the particle images, a digital camera 24 was used (RED SCARLET-X DSMC, sensor: MYSTERIUM-X [30 mm×15 mm], 4096×2160 pixels). A lens with a focal length equal to 50 mm was mounted on the camera 24.

Figure 6:
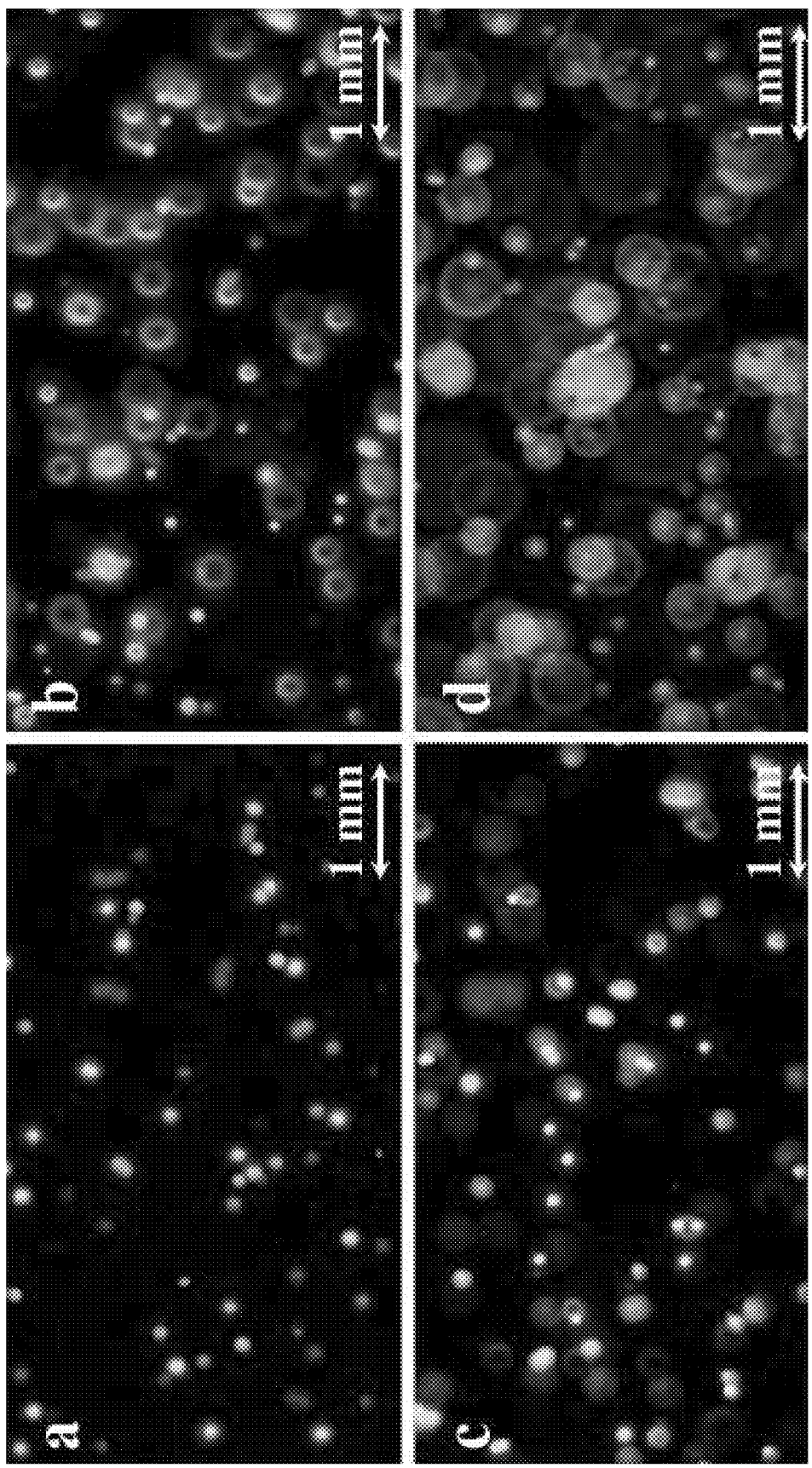
FIG. 6 includes four photographs comparing subsections of the images acquired using a hybrid lens and a refractive lens. (a) is an image obtained with the hybrid lens (DOE+ lens). (b,c,d) are images obtained when using only the refractive lens. The focus of the lenses has been adjusted respectively for blue (b), green (c) and red (d) particles.

As can be seen in FIG. 6 (b,c,d), when a standard refractive lens was used alone, the depth of field is very shallow, and only a small depth range can be in focus. For these three cases the other wavelengths are out of focus, which makes it impossible to exploit these images to retrieve the velocity of particles.

Figure 4:
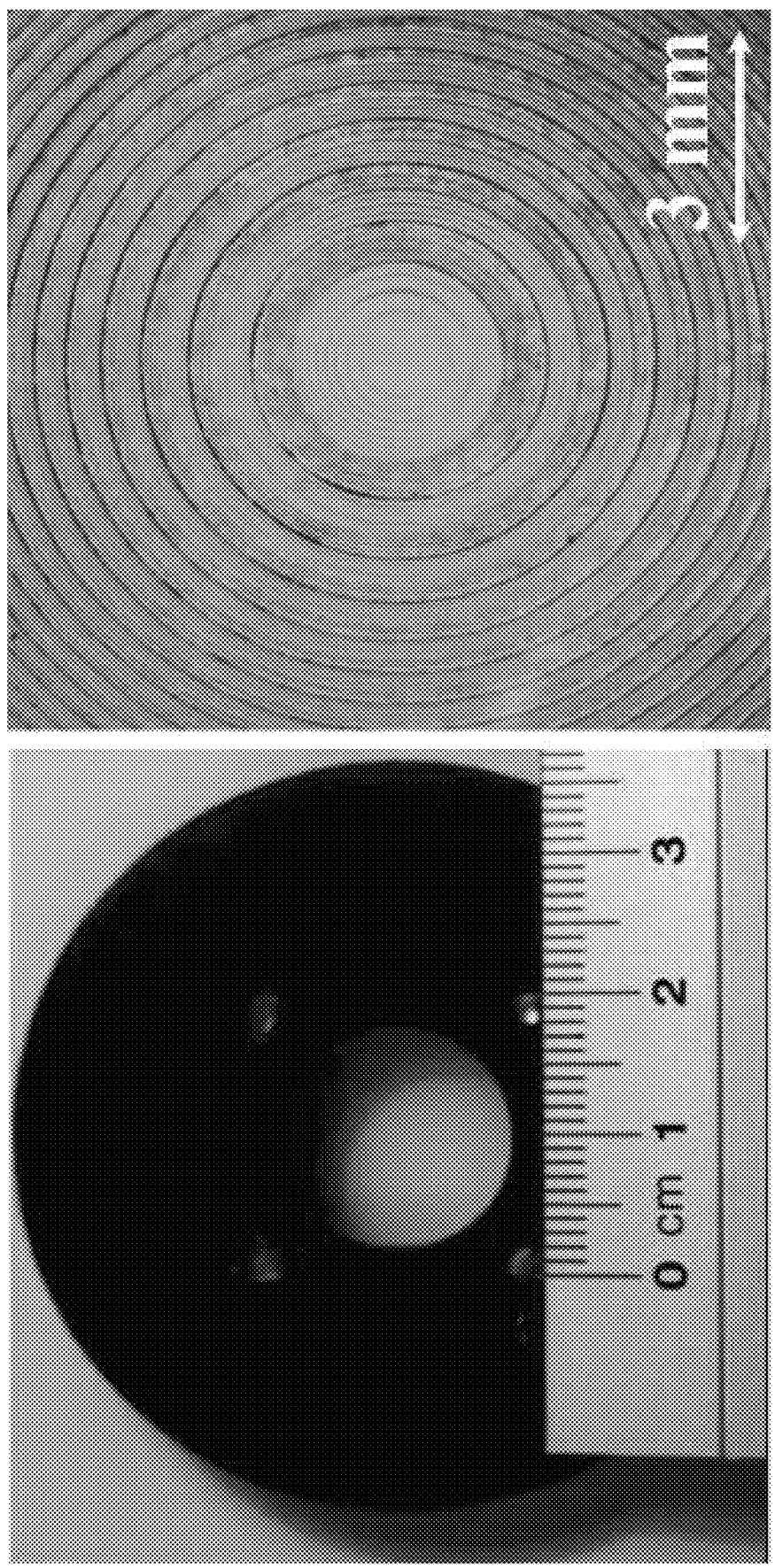
FIG. 4, includes is a top view of a diffractive optical element, fixed on a support and destined to be mounted on the refractive lens (left). On the right, a microscopic view of the designed diffractive optical element is shown.

To rectify this situation a DOE (FIG. 4) was designed in order to overcome this limitation. With a standard refractive lens, the thickness of the measurement volume that is in focus is extremely small for many fluid imaging problems of practical interest. In our case, since the wavelength of the light that illuminates the particles 20 varies linearly in the volume 22, the in-focus measurement volume can be easily extended by adding a DOE to the camera optics.

When designing the DOE 26 we must ensure that all wavelengths are focused on the same sensor plane of the camera 24. Moreover, the aperture and the magnification of the hybrid lens should allow for an image of good quality.

Figure 15:
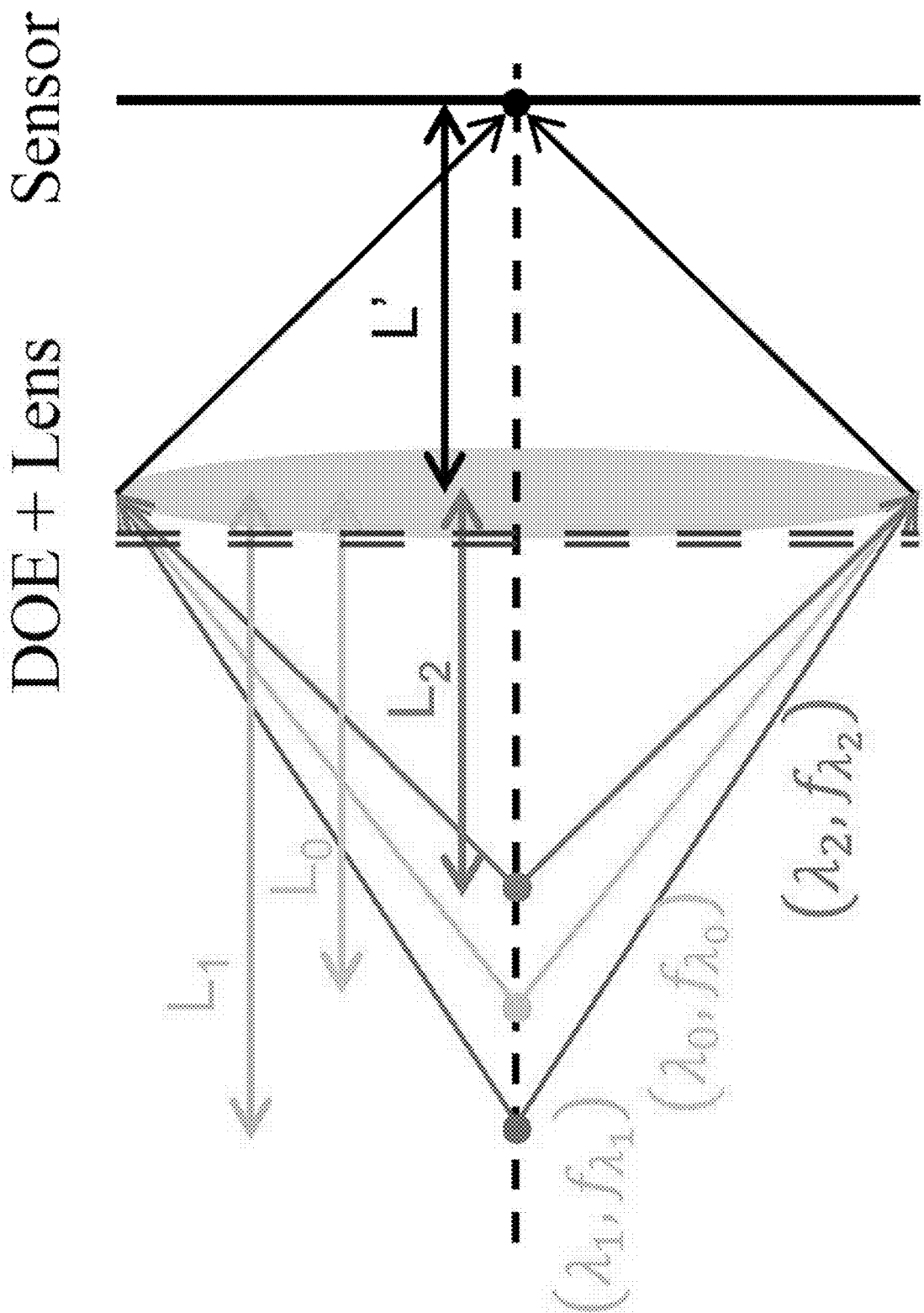
FIG. 15 is a schematic view of a hybrid refractive-diffractive lens. All particles illuminated by a light, whose wavelength is included in $[\lambda_1, \lambda_2]$, will be focused on the sensor plane of the camera.

FIG. 15 shows a schematic for a hybrid refractive-diffractive lens. The aim is to design a DOE 26 that allows the user to have all particles illuminated by a light, whose wavelength is included in $[\lambda_1, \lambda_2]$ and whose reflection from the particles 20 is focused on the same sensor plane.

A DOE is characterized by its phase, which can be expressed as follows;

$$\phi(r) = \frac{2\pi}{\lambda} \cdot \frac{r^2}{f_\lambda^{DOE}}, \quad\quad (19)$$

Where r is the radial distance to the center of the DOE, $\lambda$ is a given wavelength, and $f_\lambda^{DOE}$ is the focal length of the DOE associated to the wavelength $\lambda$. For a DOE the focal length is spectral-dependent, and obeys the following relationship:

$$\lambda \cdot f_\lambda^{DOE} = \text{constant}. \quad\quad (20)$$

Thereafter, the wavelength $$\lambda_0 = \frac{2 \cdot \lambda_1 \cdot \lambda_2}{\lambda_1 + \lambda_2},$$

will be used to design the DOE. Thus, we only need to determine $f_{\lambda_0}^{DOE}$, in order to recover the phase of the DOE.

On one hand, the thickness of the measurement volume $\Delta z = L_1 - L_2$ is enforced by the used setup. With reference to FIG. 15, the distances $L_1$ and $L_2$ are expressed as follows, as a function of L' the distance between the hybrid lens and the sensor, and $f_\lambda$ the focal length of the hybrid lens:

$$L_{1/2} = \frac{L' \cdot f_{\lambda_{1/2}}}{L' - f_{\lambda_{1/2}}} \quad (21)$$

Furthermore, ($f_\lambda$) can be expressed as:

$$\frac{1}{f_\lambda} = \frac{\lambda}{\lambda_0 \cdot f_{\lambda_0}^{DOE}} + \frac{1}{f_L} \Leftrightarrow f_\lambda = \frac{\lambda_0 \cdot f_{\lambda_0}^{DOE} \cdot f_L}{\lambda_0 \cdot f_{\lambda_0}^{DOE} + \lambda \cdot f_L}. \quad (22)$$

By combining the Equations 21 and 22 in the expression of $\Delta z$, we obtain:

$$\Delta z = \frac{\lambda_0 f_{\lambda_0}^{DOE} f_{fL} L'}{(\lambda_0 f_{\lambda_0}^{DOE} + \lambda_1 f_L) - \lambda_0 f_{\lambda_0}^{DOE} f_L} - \frac{\lambda_0 f_{\lambda_0}^{DOE} f_L L'}{(\lambda_0 f_{\lambda_0}^{DOE} + \lambda_2 f_L) - \lambda_0 f_{\lambda_0}^{DOE} f_L} \quad (23)$$

Here $f_L$ is fixed by the choice of the refractive lens, $\Delta z$, $\lambda_1$ and $\lambda_2$ are measured and depend on the illumination setup. Therefore, the focal length of the DOE $f_{\lambda_0}^{DOE}$ the distance L' are retrieved by minimizing the difference between the two terms of the equation 23.

To ensure a good quality of the obtained image, we have to add some constraints to this minimization. These constraints involve the aperture $$\left(F\# = \frac{L'}{D}\right)$$

and the magnification $$\left(\Upsilon(\lambda) = \frac{L_\lambda}{L'}\right)$$

of the hybrid lens. Where D is the diameter of the hybrid lens, and $L_\lambda$ is the distance between the hybrid lens and the plane illuminated by a light with a wavelength equal to $\lambda$. The constraint on the aperture will improve the signal to noise ratio of the obtained image, while the constraint on the magnification will warrant a good size match between the measurement volume and the acquired image. Once the optimal focal length $f_{\lambda_0}^{DOE}$ is retrieved, the DOE is completely characterized by its phase (See Equation 19).

The following table presents the different characteristics of the hybrid lens (DOE+lens):

| Symbol | Description | Value |
|---|---|---|
| $D_{DOE}$ | DOE diameter | 16 mm |
| $f_{\lambda_0}^{DOE}$ | DOE focal length for $\lambda_0 = 563$ nm | 401.8 mm |
| $\gamma$ | Magnification | 2.065 |
| F# | Aperture | 4.125 |
| L' | Distance hybrid lens-sensor | 66 mm |
| $L_2$ | Distance hybrid lens-volume | 127.3 mm |

The image of particles acquired using the hybrid lens is presented in FIG. 6 (a). One can notice that for this case all particles 20 within the measurement volume 22 are in focus. Their size on the image is almost the same, contrary to the defocused images obtained without using the DOE.

Measured Flows: Two types of experiments were realized using transparent, rectangular flow volumes (tanks) made of glass plates placed on a brass metal support.

(I) Experiments with a ground truth were performed using a high viscosity transparent fluid (PSF—1,000,000 cSt Pure Silicone Fluid). Its viscosity is one million times higher than that of water. White particles (White Polyethylene Microspheres with a diameter in the range [90, 106 µm]) were introduced into this liquid. This involved heating the liquid while stirring in the particles 20, followed by vacuum treatment to eliminate bubbles. After cooling the liquid, the particles 20 become frozen in place. Then, experiments were conducted by applying a known movement (translations or rotation) to the tank using micro-meter stages. Therefore, the particle motion is known, since they are immobile with respect to the flow volume 22 (tank).

(II) An experiment without "ground truth" was realized using the same white particles 20, after introducing them into a flow volume (tank) 22 containing tap water. A small amount of surfactant (Polysorbate 80 Water) was added to the water in order to reduce the surface tension of the water. This was to avoid the agglomeration of particles 20 in the flow volume (tank) 22. In this case, the particle motion was generated manually through stirring, pouring, and similar excitations.

Velocity Vector Field Reconstruction Results: In this section we first evaluate our proposed approaches based on synthetic examples for ground truth comparisons. Then, we conducted two types of experiments, wherein the first one was to move particles 20 with known motion vectors, verifying the accuracy of our methods on real data, the second one was to work on practical fluids.

Synthetic simulations: To quantitatively assess our reconstruction method, we tested our algorithm on simulated data. A volume with the size of 100×100×20 (X×Y×Z) was simulated and we randomly generated 1000 particles in the volume. The particles were advected by ground truth flow vectors over time, such that we can obtain time evolved particle distributions. Using the image formation model from Equation 1 we simulated a time sequence of five captured images.

We compared our proposed velocity vector reconstruction algorithm, referred to "S-T div-H&S" with the general multi-scale Horn-Schunck algorithm "H&S" [Meinhardt-Llopis et al. 2013] and its extension by introducing divergence free constraint as a proximal operator "div-H&S" [Gregson et al 2014]. Note that the last two approaches compute the motion between one pair of frames independently, while our approach works on a sequence of frames simultaneously.

Figure 8:
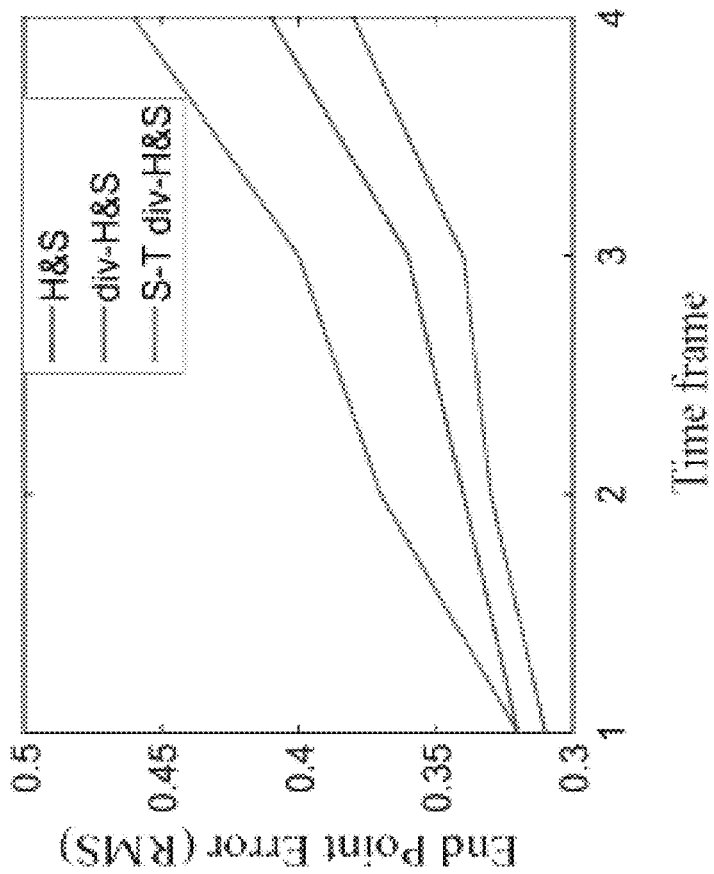
FIG. 8 shows two graphs providing numerical comparisons with ground truth data for different algorithms. On the left, average angular error (in degrees) is shown. On the right, average end-point error (in pixels) is shown.
Figure 8:
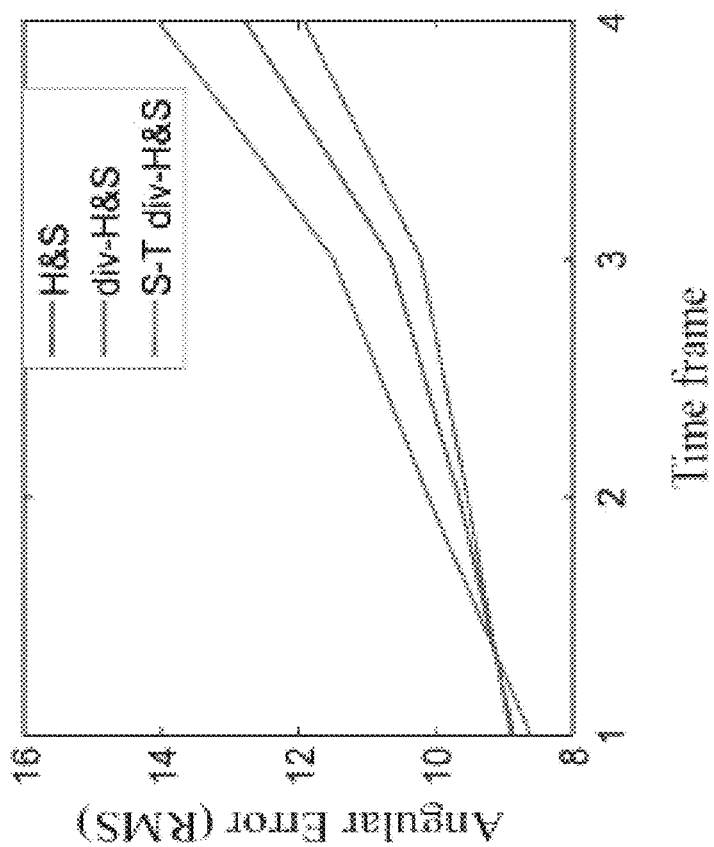

The average end-point error and average angular error for these three approaches at different time steps are shown in FIG. 8. Due to the accumulative error of first order motion integration, the reconstruction errors increase over time in all methods. However, by considering temporal coherence, our proposed method exhibits better performance compared to the other two approaches. We point out that a temporal smoothness regularized may not necessarily result in improved reconstruction results at each particular time step, however, it conveys better estimations in the temporal domain. This is essential for video frames captured in real-world experiments.

Experiments with a ground truth: To evaluate the effectiveness of our proposed methods on real captured data, we firstly conducted the experiments with a flow volume (tank) containing seeded particles in a high viscosity liquid. The flow volume (tank) was placed on a multi-dimensional translation/rotation stage such that reconstruction results of the algorithm could be compared with ground truth movements. Three independent tests were performed:

1. Translation (displacement) in the x direction (i.e. perpendicular to the camera's line of sight): five (5) frames were acquired. Between each two successive frames, a translation (displacement) of 0.2 mm in the x direction was applied.
2. Translation (displacement) in the z direction (i.e. along the camera's line of sight): five (5) frames were acquired. Between each two successive frames, a translation (displacement) of 0.5 mm in the z direction was applied. In this case, the translation is larger, in order to observe more easily the color change.
3. An approximation of a rotation around the vertical (y) axis in a clockwise direction. With our setup of "frozen" particles in a flow volume, only an approximation of this rotational motion was possible, since it is not possible to tilt the flow volume (tank) relative to the camera's line of sight in order to avoid distorting the flow volume by refraction. We therefore approximated rotational flow by rotating the rainbow illumination pattern relative to the flow volume (tank). In practice, the flow volume (tank) and the camera were mounted together on a rotation table with a fixed relative positioning, and the lighting setup was fixed. The rotations were performed from an angle of −8° to 8° (the reference was defined when the flow volume (tank) is aligned with the (x, z) directions). Between each two successive frames, a rotation of an angle equal to 4° was applied.

Figure 9:
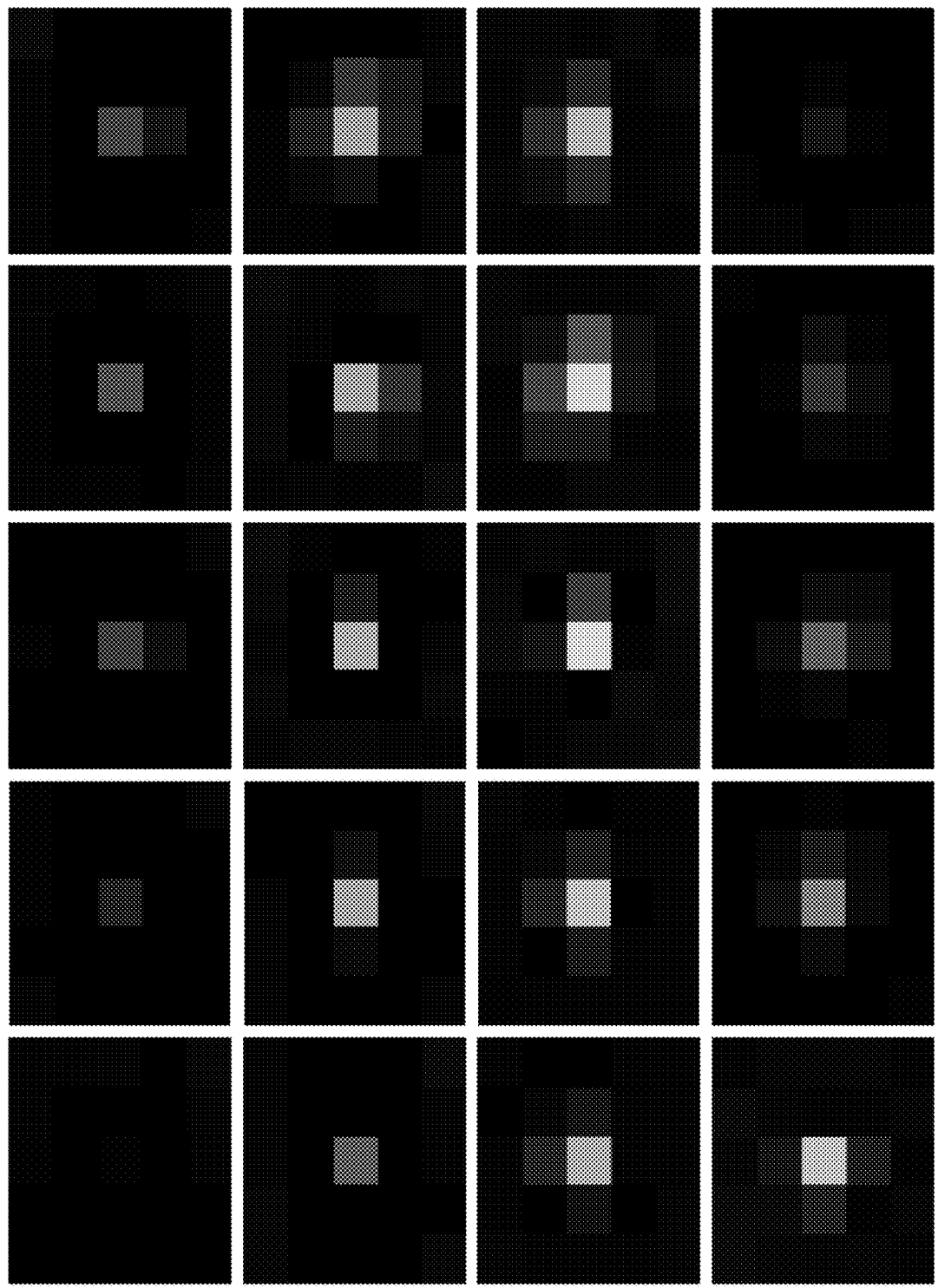
FIG. 9 illustrates calibrated point spread functions (PSFs) for different layers along depth direction, from a near camera side to a far-end of the camera.

Before processing the captured images, we first passed them through a Gaussian filter and then downsampled them by a factor of eight (8), hence the resolution for the downsampled image is about 100 μm/pixel, approximately one particle per image pixel. We discretized the wavelength coordinate into 20 levels, corresponding to 90 μm/layer. The calibrated point spread functions for each levels are shown in FIG. 9. It should be noted that the resolution along the wavelength coordinate is about 9 times coarser than that in the x-y plane.

Figure 10:
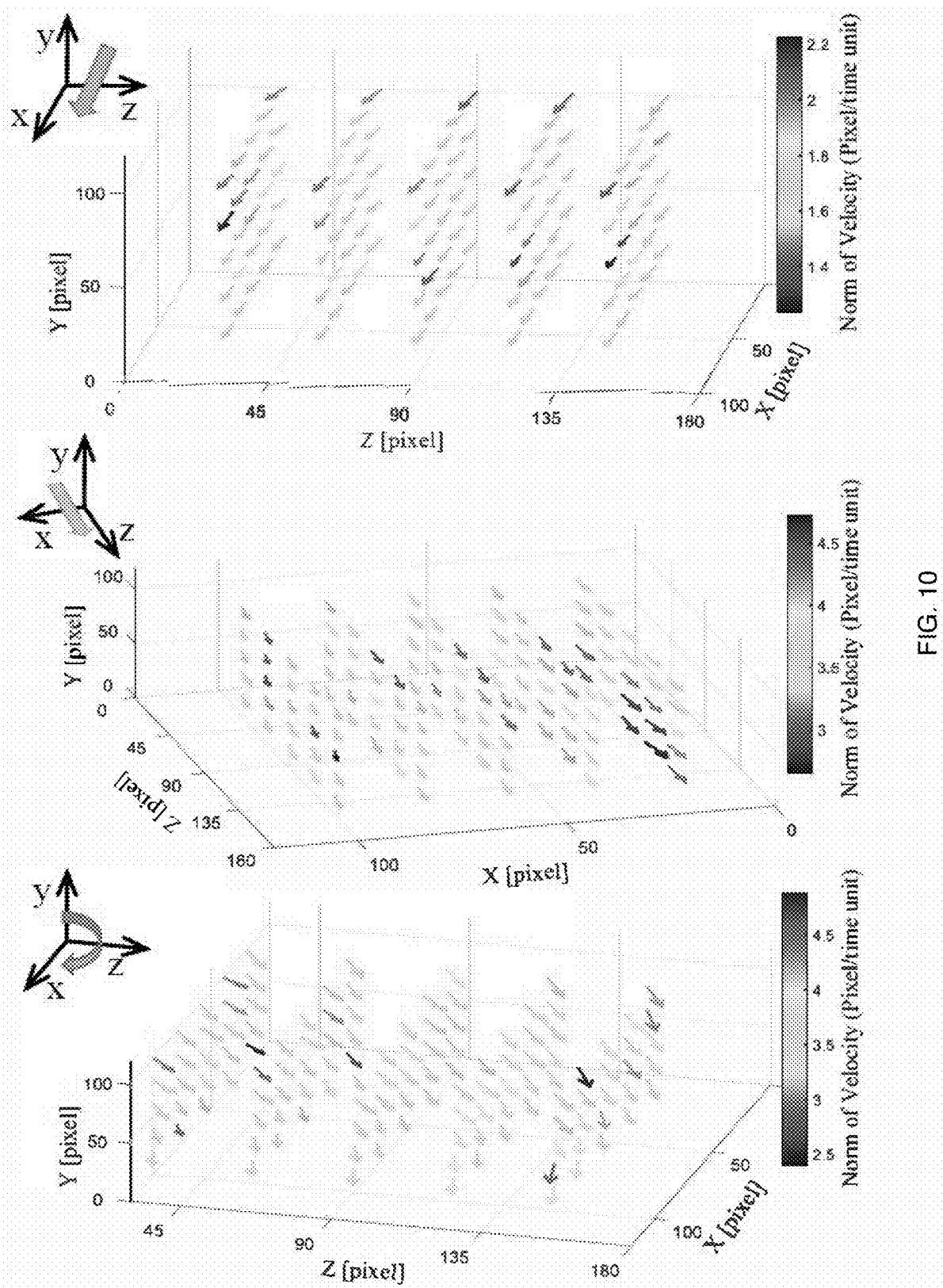
FIG. 10 illustrates the reconstructed velocity vector fields induced by moving the measurement flow volume with a rotation stage. The top representation shows a translation along the x direction. In the middle representation, a translation along the z direction (towards the camera) is shown. The bottom representation depicts a rotation along the y axis in clockwise direction. The magnitude of the vectors are coded by color.
Figure 11:
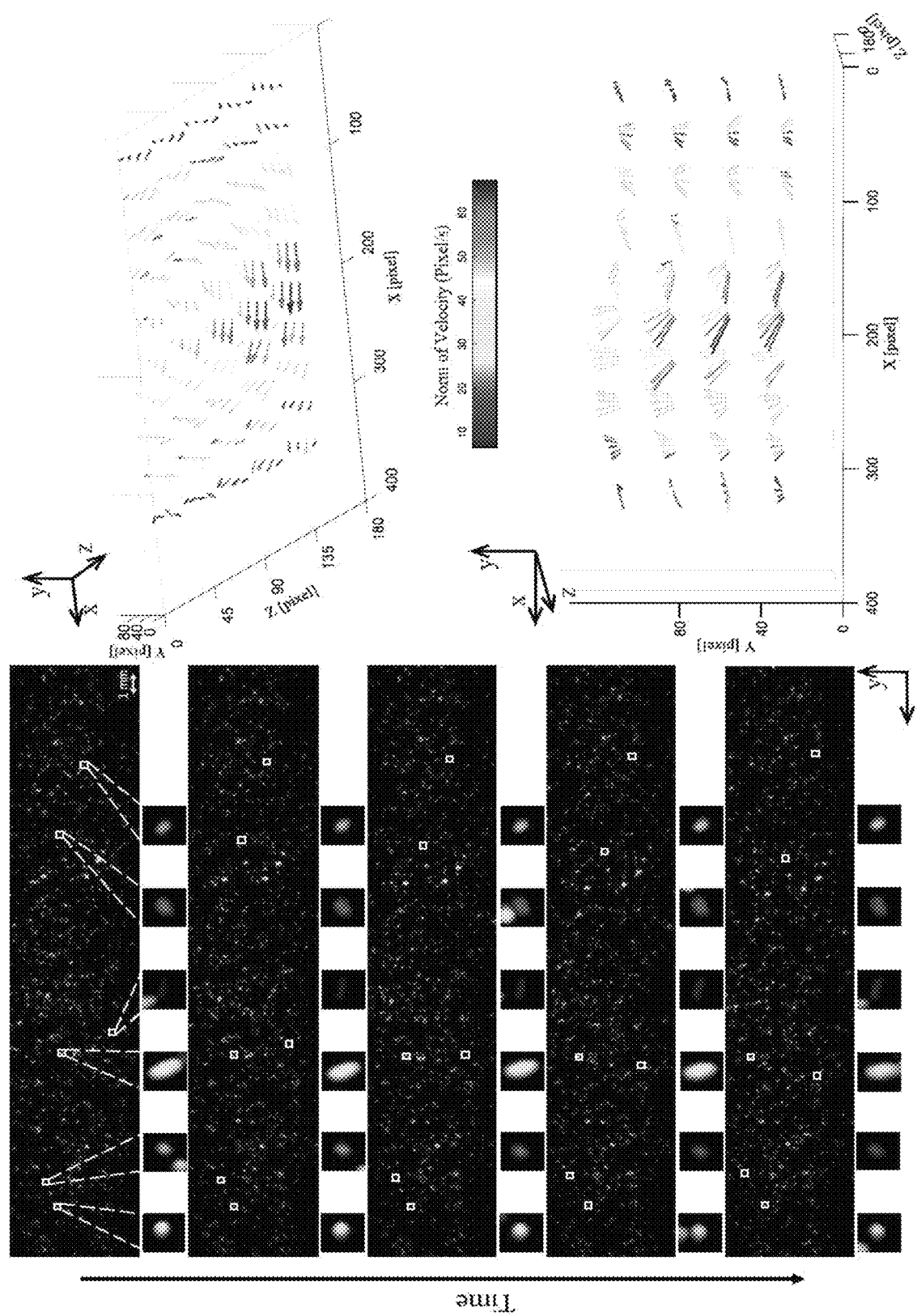
FIG. 11 (left) shows successively captured images (without post-processing) in a video frame. Six representative particles are tracked in the time sequential frames to verify the reconstructed flow structure. On the right, computed flow vectors according to the given frame data, are shown viewed from different angles.

The reconstructed velocity vector fields are visualized in FIG. 10. The overall structures of the reconstructed flow in all three cases reveal that a significant part of the real flow structures are reproduced.

Furthermore, we can numerically analyze the reconstructed results with respect to the ground truth movements. In the experiments, the x-axis and the z-axis translations moved respectively 200 μm and 500 μm in one time step, which corresponds in the captured images to 2 and 5 pixels. In the rotation test, the total rotation π/45 rad, and the 2D plane of the test section has the physical size of 10 mm×18 mm (x×y) and the distance from the center of the test section to the center of rotation was 10 mm, hence the practical magnitudes of the displacements are about 334 μm (3.3 pixel sizes) on the part at the near-end of the center and 506 μm (5.1 pixel sizes) on the part at the far-end of the center of rotation. The computed magnitudes of the flow vectors were encoded by color in our represented results.

The mean of the norm of the velocity in the left translational experiment is 1.75 pixel sizes with standard deviation of 0.15, while the mean of that in the experiment of translating towards camera was 3.48 pixel sizes with standard deviation of 0.79. We can see that reconstructed flow vectors reveal higher accuracy for the flow perpendicular to the optical axis with respect to the flow in a longitudinal direction. This is reasonable since: (1) depth resolution is highly limited compared to lateral resolution as camera is much more sensitive to the spatial change of objects in 2D plane than the change of wavelength, which results in coarser reconstructed flow vectors along the wavelength coordinate. (2) the error may also come from a bias of reconstructed particle distributions.

Determination of the spatial positions of the particles along the z axis involves higher uncertainties. Moreover, distortion caused by the refractive effect of the applied high viscosity materials, arises when moving the flow volume (tank) along the z axis. As the thickness of the material between the camera and the illuminated particles changes, the PSFs are altered simultaneously. Fortunately, this issue does not exist when measuring practical fluid flow, where the particles move, instead of the light beam. Though facing the fact of relatively low reconstruction accuracy for flow in an axial direction, not only in simple translational structures, vortical flows were also reasonably reproduced, and the error in the wavelength axis is within a certain tolerance, which, in general is no more than half of length of the discretization intervals.

Experiments without ground truth: Finally, we test our Rainbow PIV system on four different flows of varying complexity (FIGS. 11-14). Five successive captured images are shown in the left hand side of FIG. 11, and the reconstructed velocity vectors are visualized on the right hand side of the same figure. Six representative particles are manually selected to verify the accuracy of the computed flow vectors. The first particle moves upward in the image plane, and the color of it changes from green to cyan, which states that it moves away from the camera. The second particle moves upward and slightly to the right in the image plane and in the depth direction, it moves to the far-end of the camera. The third particle moves to the upper left, color changes from green to cyan. The fourth particle quickly moves to the left hand side with no significant color change. From the fourth particle, we can observe a certain amount of motion blur due to its large velocity. The fifth and sixth particles move downwards in the image plane and towards camera in the wavelength domain, while the orange one moves to the left and blue one moves to the right.

Figure 12:
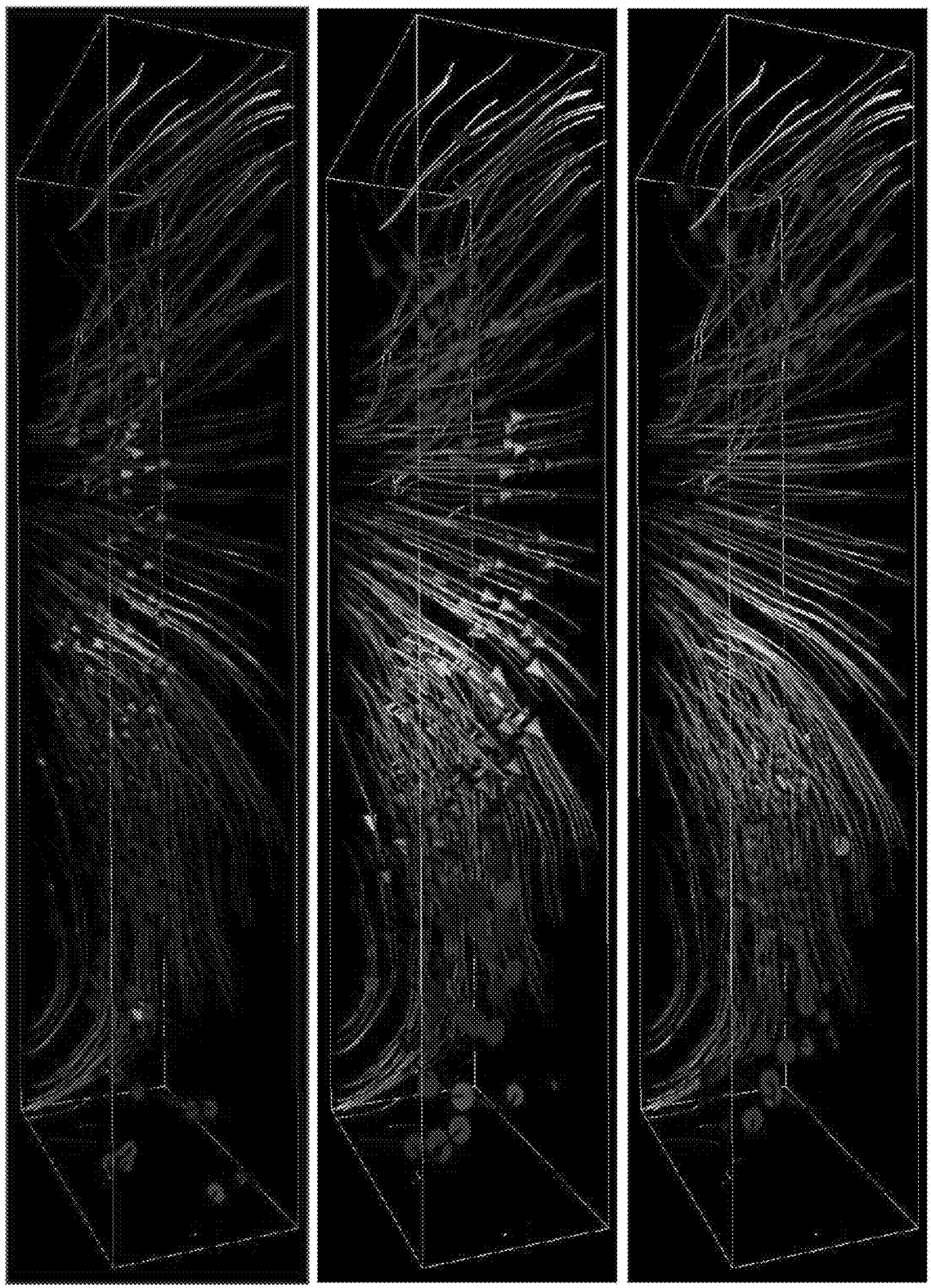
FIG. 12 is a series of path line visualizations of the dataset from FIG. 11, with virtual particle positions indicated for three different time steps.

Comparing the motion of these chosen particles with the corresponding flow vectors in the reconstructed results, it reveals that overall agreement is achieved. In addition, the actual stirred flow structure is supposed to be a vortex, rotating in a clockwise direction. We observe that the key features of the vortex structure are well reconstructed by our developed methods. A path line visualization of the same velocity data is shown in FIG. 12. Note that the particles in the visualization are seeded synthetically and do not directly correspond to Rainbow PIV particles.

Figure 13:
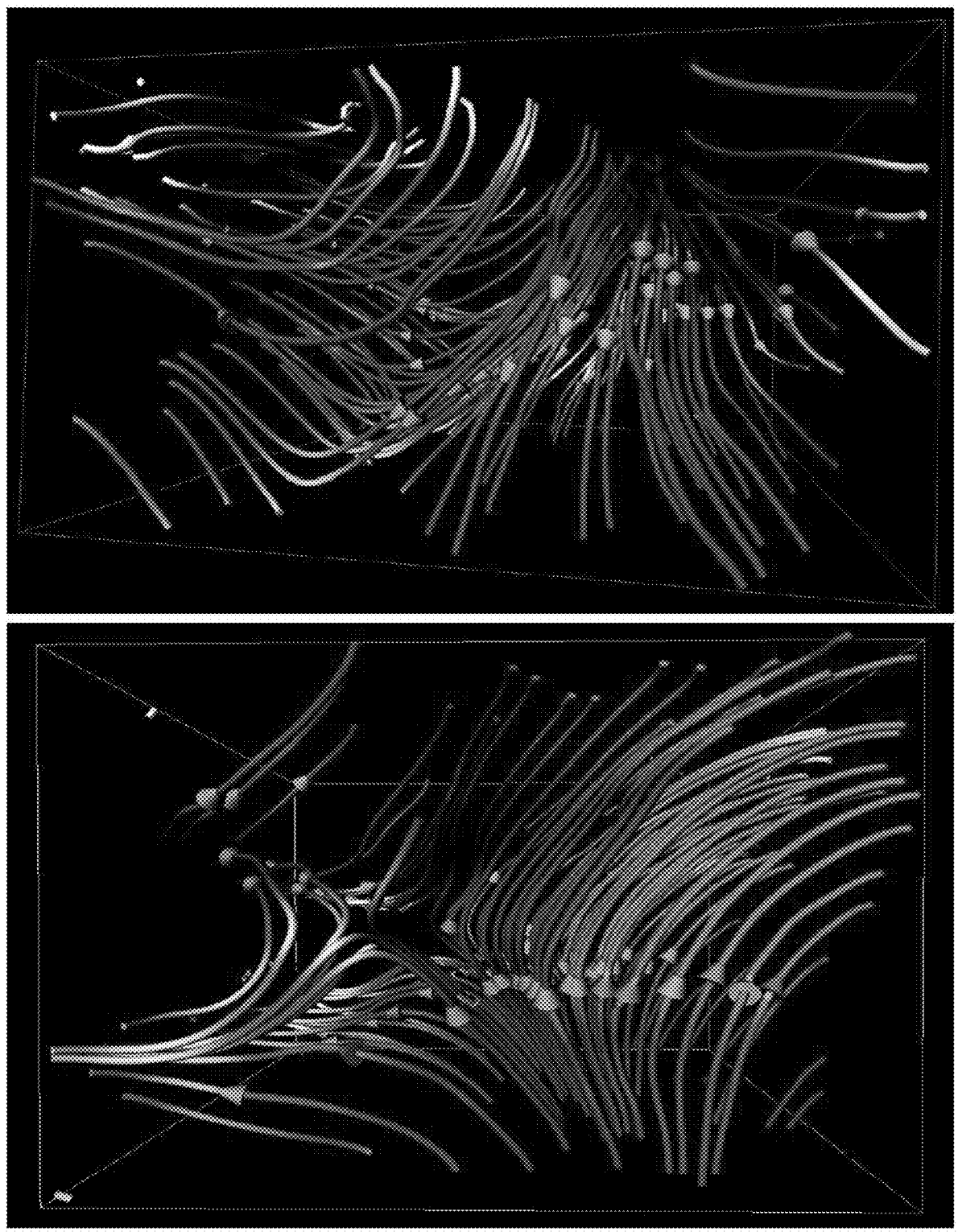
FIG. 13 shows two path line visualizations for two more datasets, corresponding to a drop of water being dripped into the volume from the top (top image), and a small jet of water being injected from the bottom (bottom image).

FIG. 13 shows two more data sets, one with a drop of water being dripped into the flow volume from the top, and one where a small amount of liquid is injected into the flow volume from the bottom. The recovered flow field in both cases is consistent with both the expectations and the observed Rainbow PIV frames.

Figure 14:
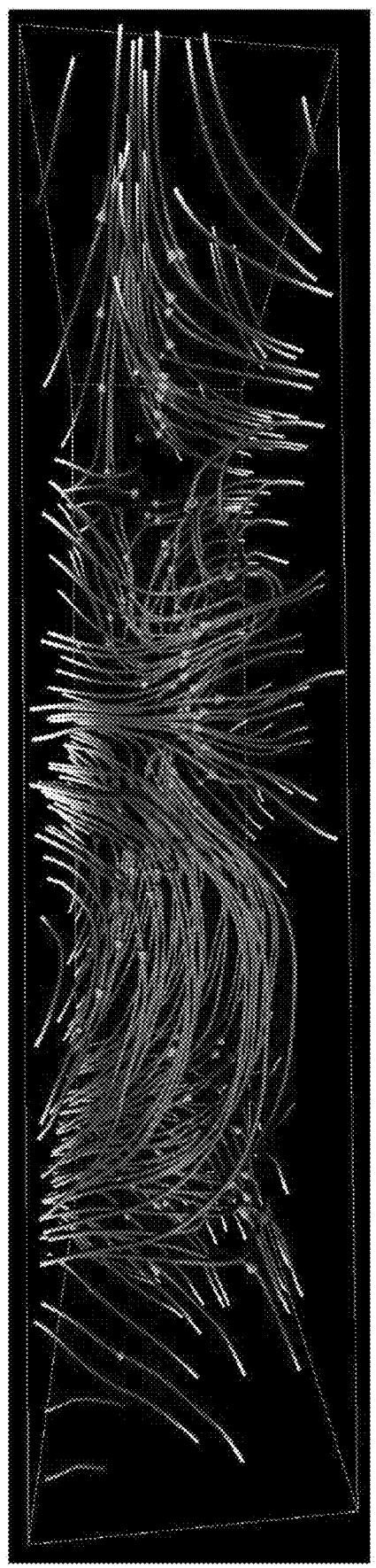
FIG. 14 is a path line visualization of a complex flow created by stirring the fluid, showing two vortices that interact in a complex fashion. The visualization uses virtual particles that do not correspond directly to real particles imaged with Rainbow PIV.

Finally, the host complex example is shown in FIG. 14. This flow was generated by strongly stirring the fluid, and then letting it set. After a while, the pictured two-vortex structure can be observed. Like many fluid imaging methods, Rainbow PIV has problems reconstructing flows with strong motion blur. This limits our ability to reconstruct the early stages of this experiment. To overcome this limitation, high speed cameras could be used in conjunction with stronger light sources.

The present application discloses a novel Rainbow PIV system together with optimization strategies, which enables the user to recover the 3D fluid flow structures using a single color camera, greatly reducing the hardware setup requirements and easing calibration complexity compared to the other approaches handling 3D-3C measurements. Our approach is implemented by illuminating particles in the volume with "rainbow" light such that the depth information for the particles is color-coded into the captured images, and the 3D trajectory of particles can be tracked by analyzing the 2D spatial motion in the image plane and the color change in the wavelength domain. A specially designed DOE helps to focus all the wavelength planes on the sensor plane simultaneously, to achieve high lateral resolution and relatively large depth of focus at the same time.

We then formulated an inverse problem to reconstruct the particle positions in 3D using a sequence of frames to alleviate the ambiguity issues of identifying particle positions from a single frame. With the recovered particle locations at different time steps, a further step is taken to reconstruct the fluid velocity vector fields. An optimization problem integrating the conventional Horn-Schunck algorithm with physical constraints is proposed to compute the flow vectors.

We demonstrate our approach both on synthetic flows induced by moving a frozen particle volume and by using a real stirred flow. Overall, our method can robustly reconstruct a significant part of the flow structures, and also good accuracy.

The primary drawback of our system is the limited spatial resolution along the wavelength (depth) coordinate. Due to the existence of noise and light scattering issues, and relatively low sensitivity of the camera to the wavelength change, at current stage the wavelength coordinate is not allowed to be discretized any further. In the further this situation could be improved by making use of the IR end of the spectrum instead of blue light, where camera sensitivity is rather low. Other possible improvements include the use of cameras with additional color primaries, or primaries that are optimized for this task. Despite these issues, on account of the simple setup and the good accuracy, our system can be easily implemented and applied to investigate new types of fluid flows in the future.

While this disclosure has been described using certain embodiments, it can be further modified while keeping within its spirit and scope. This application is therefore intended to cover any variations, uses, or adaptations of the disclosure using its general principles. Further, this application is intended to cover such departures from the present disclosure as come within known or customary practices in the art to which it pertains and which fall within the limits of the appended claims.

REFERENCES

1. Adrian, R. J., and Westerweel, J. 2011. *Particle image velocimetry*, Cambridge University Press.
2. Atchson, B. Ihrke, I Heidrich, W., Texs, A., Bradley, D., Magnor, M. and Seidel, H.-P. 2008. Time-resolved 3D Capture of Non-stationary Gas Flows. *ACM Trans. Graph* 27, 5, 132.
3. Boyd, S., Parikh, N., Chu, E., Peleato, B., and Eckstein, J. 2011. Distributed optimization and statistical learning via the alternating direction method of multipliers, *Foundations and Trends in Machine Learning* 3, 1, 1-122.
4. Candes, E. J., Wakin M. B., and Boyd, S. P. 2008. Enhancing sparsity by reweighted 1 minimization. *J. Fourier analysis and applications* 14, 5-6, 877-905.
5. Casey, T. A., Sakakibara, J., and Thoroddsen, S. T. 2013. Scanning tomographic particle image velocimetry applied to a turbulent jet, *Phys Fluids* 25, 025102.
6. Elsinga, G. E., Scarano, F., Wieneke, B., and Van Oudheusden, B. W. 2006. Tomographic particle image velocimetry. *Experiments in Fluids* 41, 6, 933-947.
7. Fediw, R., Stam, J., and Jensen, H. W. 2001. Visual simulation of smoke. In *Proc. ACM Siggraph,* 15-22.
8. Foster, N., and Metaxas, D. 1997. Modeling the motion of a hot, turbulent gas. In *Proc. ACM Siggraph,* 181-188.
9. Gregson, J., Krimerman, M., Hullin, M. B., and Heidrich, W. 2012. Stochastic tomography and its applications in 3d Imaging of mixing fluids. *ACM Trans. Graph.* 33, 4, 52-1.
10. Gregson, J., Ihrke, I., Thuerey, N., and Heidrich, W. 2014. From capture to simulation: connecting forward and inverse problems in fluids. *ACM Trans. Graph.* 33, 4, 139.
11. Gu, J., Nayar, S., Grinspun, E., Belhumeur, P., and Rammoorthi, R. 2013. Compressive Structured Light for Recovering Inhomogeneous Participating Media. *IEEE PAMI* 35, 3, 555-567.
12. Hasinoff, S. W., and Kutulakos, K. N. 2007. Photo-consistent Reconstruction of Semitransparent Scenes by Density-sheet Decomposition. *IEEE PAMI* 29, 5, 870-885.
13. Hawkins, T., Einarsson, P. and Debevec, P. 2005. Acquisition of Time-Varying Participating Media. *ACM Tans. Graph.* 24, 3, 812-815.
14. Heitz, D., Mémin, E., and Schnörr, C. 2010. Variational fluid flow measurements from image sequences: synopsis and perspectives, *Experiments in Fluids* 48, 3, 369-393.
15. Herlin, I., Béréziat, D., Mercier, N., and Zhuk, S. 2012. Divergence-free motion estimation. In *Proc. ECCV* 15-27.
16. Hinsch, K. D. 2002 Holographic particle image velocimetry. *Measurement Science and Technology* 13, 7, R61.
17. Horn, B. K., and Schunck, B. G. 1981 Determining optical flow. *Artificial Intelligence* 17, 1-3, 185-203.
18. Ihrke, I. and Magnor, M. 2004. Image-Based Tomographic Reconstruction of flames. In *Proc. SC,* 367-375.
19. Levoy, M., Ng, R., Adams, A. Footer, M., and Horowitz, M. 2006. Light field microscopy. *ACM Trans, Graph.* 25, 3, 924-934.
20. Liu, T., and Shen, L. 2008. Fluid flow and optical flow. *J. Fluid Mechanics* 614, 253-291.
21. Liu, T., Merat, A.,Makhmalbaf, M., Fajardo, C., and Merati, P. 2015. Comparison between optical flow and cross-correlation methods for extraction of velocity fields from particle images. *Experiments in Fluids* 56, 8, 1-23.
22. Lourenco, L. Krothapalli, A., and Smith, C. 1989. Particle image velocimetry. In *Advances in Fluid Mechanis Measurements*, Springer, 127-199.
23. Lynch, K., Fahringer, T., and Thurow, B. 2012. *Three dimensional particle image velocimetry using a plenoptic camera.* American Institute of Aeronautics and Astronautics (AIAA).
24. McGregor, T., Spence, D., and Coutts, D. 2007. Laser based volumetric colour-coded three-dimensional particle velocimetry, *Optics and Lasers in Engineering* 45, 8, 882-889.

25. Meinhardt-Llopis, E., Pérez, J. S., and Kondermann, D. 2013. Horn-schunck optical flow with a multi-scale strategy. *Image Processing on line* 2013, 151-172.
26. Ng,. R., Levoy, M., Duval, G. Horowitz, M., and Hanrahan, P. 2005. Light field photography with a hand-held plenoptic camera. *Computer Science Technical Report CSTR* 2, 11, 1-11.
27. Okamoto. K., Nishio, S., Saga, T., and Kobayashi, T. 2000. Standard images for particle-image velocimetry. *Measurement Science and Technology* 11, 6, 685.
28. Parikh, N., Boyd, S. P. et al 2014. Proximal algorithms. *Foundations and Trends in Optimization* 1, 3, 127-239.
29. Prasad, A. K. 2000. Particle image velocimetry. *Current Science-Bangolore*-79, 1, 51-60.
30. Ruhnau, P. Stahl, A., and Schnorr, C. 2007. Variational estimation of experimental fluid flows with physics-based spatio-temporal regularization. *Measurement Science and Technology* 18, 3, 755.
31. Stam, J. 1999. Stable fluids. In *Proc. ACM Siggraph*. 121-128.
32. Stansislas, M., Okamoto, K. Kähler, C. J., Westerweel, J. and Scarano, F. 2008. Main results of the third international piv challenge. *Experiments in Fluids*, 45, 1, 27-71.
33. Watamura, T. Tasaka, Y., and Murai, Y. 2013. LCD-projector-based 3D color PTV. *Experimental Thermal and Fluid Science* 47, 68-80.
34. Willert, C. and Gharib, M. 1992. Three-dimensional particle imaging with a single camera. *Experiments in Fluids* 12, 6, 353-358.
35. Yuan, J., Schörr, C., and Steidl, G. 2007. Simultaneous higher-order optical flow estimation and decomposition. *SIAM Journal on Scientific Computing* 29, 6, 2283-2304.

What is claimed:

1. A method for obtaining a three dimensional, three component velocity measurement of particles moving within a flow volume, the method comprising:
   providing a time sequenced series of images of a flow volume containing at least one particle resident moving within a fluid, wherein depth information of the at least one particle moving within the fluid volume is color coded into the images as a consequence of reflected lights from the at least one particle; and
   tracking a three dimensional (3D) trajectory of the at least one particle by analyzing a two dimensional (2D) spatial motion of the at least one particle based on (1) the time sequenced series of the images and (2) a change in color of the reflected lights from the at least one particle,
   wherein the reflected lights from the at least one particle and reflected lights from other particles of the flow volume are focused on a same sensor plane of a single optical device for processing.

2. The method of claim 1, wherein the step of providing a flow volume containing at least one particle resident within a fluid further comprises;
   illuminating the flow volume with a plurality of light sheets, each light sheet having a respective depth position within the flow volume and a specific wavelength associated therewith;
   detecting reflections of light from the particles within the flow volume with the single optical device; and
   recording the reflections of light from the at least one particle in an image, wherein depth information of the at least one particle within the fluid volume is color coded into the image as a consequence of the particular wavelength of the light sheet, which is reflected from the at least one particle.

3. The method of claim 2 further comprising: adding to the single optical device a diffractive optical apparatus to focus all of the wavelengths of the lights sheets simultaneously, onto the same sensor plane, to achieve a high resolution and a large depth of focus at the same time.

4. The method of claim 2 further comprising: arranging the plurality of light sheets to form a continuum of light sheets, with the dimension of the wavelengths of the individual light sheets varying linearly over the depth positioning of the individual light sheets.

5. The method of claim 1 wherein the step of tracking a three dimensional (3D) trajectory of at least one particle comprises, estimating an initial location of the at least one selected particle within the flow volume.

6. The method of claim 5 wherein a probability distribution of the initial location is calculated using a series of time sequenced images of the at least one selected particle.

7. The method of claim 6 further comprising, reconstructing fluid velocity vector fields using the series of time sequenced probability distributions for particle locations.

8. The method of claim 7, wherein the fluid velocity vectors fields are computed using a three dimensional (3D) optical flow technique that accounts for both physical constraints as well as the color coding of depth information in the images.

* * * * *